US011117571B2

(12) United States Patent
Noguchi et al.

(10) Patent No.: US 11,117,571 B2
(45) Date of Patent: Sep. 14, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Junpei Noguchi, Wako (JP); Chie Sugihara, Tokyo (JP); Yuta Takada, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/894,994

(22) Filed: Jun. 8, 2020

(65) Prior Publication Data

US 2020/0384985 A1 Dec. 10, 2020

(30) Foreign Application Priority Data

Jun. 10, 2019 (JP) .............................. JP2019-107927

(51) Int. Cl.
*B60W 30/06* (2006.01)
*G06K 9/00* (2006.01)
*G08G 1/14* (2006.01)

(52) U.S. Cl.
CPC ......... *B60W 30/06* (2013.01); *G06K 9/00812* (2013.01); *G08G 1/147* (2013.01)

(58) Field of Classification Search
CPC .............. B60W 30/06; G06K 9/00812; G06K 9/00798; G08G 1/147
See application file for complete search history.

(56) References Cited

U.S. PATENT DOCUMENTS

| | | | | |
|---|---|---|---|---|
| 6,326,915 B1 * | 12/2001 | Chen | ...................... | G01S 13/867 342/71 |
| 7,450,738 B2 * | 11/2008 | Jecker | ................... | G01S 13/931 382/104 |
| 2007/0040701 A1 * | 2/2007 | Browne | ................... | G08G 1/14 340/932.2 |
| 2017/0154530 A1 * | 6/2017 | Irion | .................. | G08G 1/09623 |

FOREIGN PATENT DOCUMENTS

JP 2011-209779 10/2011

* cited by examiner

*Primary Examiner* — Daryl C Pope
(74) *Attorney, Agent, or Firm* — Amin, Turocy & Watson, LLP

(57) ABSTRACT

A vehicle control device includes a communicator which communicates with a management device that guides a vehicle capable of automatedly traveling to a target parking space with reference to management information representing parking states of a plurality of parking spaces, a recognizer which recognizes a surrounding state of the vehicle, and a generator which generates parking state information including information representing whether other vehicles are parked in parking spaces which the vehicle passes on the basis of a result recognized by the recognizer and transmits the parking state information to the management device using the communicator.

7 Claims, 18 Drawing Sheets

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-107927, filed Jun. 10, 2019, the content of which is incorporated herein by reference.

BACKGROUND

Field of the Invention

The present invention relates to a vehicle control device, a vehicle control method, and a storage medium.

Description of Related Art

Recently, research on automatic control of vehicles has been conducted. An automatic valet parking technique of communicating with an automated driving vehicle, guiding the automated driving vehicle to a vacant space of a parking area in a facility and causing the automated driving vehicle to be automatically parked using automatic control of vehicles has been known. In this valet parking technique, a system of managing parking states of a plurality of vehicles by communicating with the plurality of vehicles and receiving signals representing that vehicles are not in a parked state from the vehicles is known (Japanese Unexamined Patent Application, First Publication No. 2011-209779).

SUMMARY

However, in the conventional technology, there are cases in which a managed parking position differs from an actual parking position when a vehicle is parked in a parking position different from a designated parking position. Accordingly, even when a vehicle is guided to a position managed as a vacant position at which no vehicle is parked, actually another vehicle may have been parked at that position. Such a situation was not sufficiently examined in the conventional technology.

An object of the present invention devised in view of such circumstances is to provide a vehicle control device, a vehicle control method, and a storage medium which can easily acquire a parking state and notify a management device of the acquired parking state.

A vehicle control device, a vehicle control method, and a storage medium according to the present invention employ the following configurations.

(1): A vehicle control device according to an aspect of the present invention includes: a communicator which communicates with a management device, the management device guiding a vehicle capable of automatedly traveling to a target parking space with reference to management information representing parking states of a plurality of parking spaces; a recognizer which recognizes a surrounding state of the vehicle; and a generator which generates parking state information including information representing whether other vehicles are parked in parking spaces which the vehicle passes on the basis of a result recognized by the recognizer and transmits the parking state information to the management device using the communicator.

(2): In the aspect of (1), the generator generates the parking state information by associating identification information of parking spaces adjacent to a route along which the vehicle travels with information representing whether other vehicles are parked in the parking spaces adjacent to the route along which the vehicle travels.

(3): In the aspect of (2), the generator acquires the identification information of the parking spaces on the basis of a result obtained by recognizing indicating objects provided in the parking spaces by the recognizer.

(4): In the aspect of (1), a parking space adjacent to the route along which the vehicle travels is specified, the communicator further communicates with another vehicle, and the vehicle control device further comprises a communication manager which transmits information representing the parking space specified by the recognizer to another vehicle parked in the parking space specified by the recognizer using the communicator.

(5): In the aspect of (4), the vehicle control device further includes a driving controller which performs at least one of speed control and steering control of the vehicle on the basis of the surrounding state recognized by the recognizer and causes the vehicle to be automatedly parked in a parking space designated by the management device, wherein, when the communicator receives information representing a parking space specified by another vehicle recognizer included in another vehicle from the other vehicle in a state in which a vehicle is parked in the parking space, the driving controller determines whether the parking space represented by the information received from the other vehicle is consistent with the parking space designated by the management device and causes the vehicle to move to the parking space designated by the management device when it is determined that the two parking spaces are not consistent with each other.

(6): In the aspect of (1), the communicator communicates with a parked vehicle parked in the parking spaces and receives a recognition result of a parked vehicle recognizer included in the parked vehicle, and the generator generates the parking state information on the basis of the recognition result received from the parked vehicle.

(7): A vehicle control method according to an aspect of the present invention is a vehicle control method, using a computer, including: communicating with a management device, the management device guiding a vehicle capable of automatedly traveling to a target parking space with reference to management information representing parking states of a plurality of parking spaces; recognizing a surrounding state of the vehicle; generating parking state information including information representing whether other vehicles are parked in parking spaces which the vehicle passes on the basis of the recognized result; and transmitting the parking state information to the management device.

(8): A storage medium according to an aspect of the present invention stores a program causing a computer to: communicate with a management device, the management device guiding a vehicle capable of automatedly traveling to a target parking space with reference to management information representing parking states of a plurality of parking spaces; recognize a surrounding state of the vehicle; generate parking state information including information representing whether other vehicles are parked in parking spaces which the vehicle passes on the basis of the recognized result; and transmit the parking state information to the management device.

According to the aspects of (1) to (8), it is possible to easily acquire a parking state and notify the management device of the acquired parking state.

DESCRIPTION OF EMBODIMENTS

First Embodiment

Hereinafter, an embodiment of a vehicle control device, a vehicle control method, and a storage medium of the present invention will be described with reference to the drawings.
[Overall Configuration]

Figure 1:
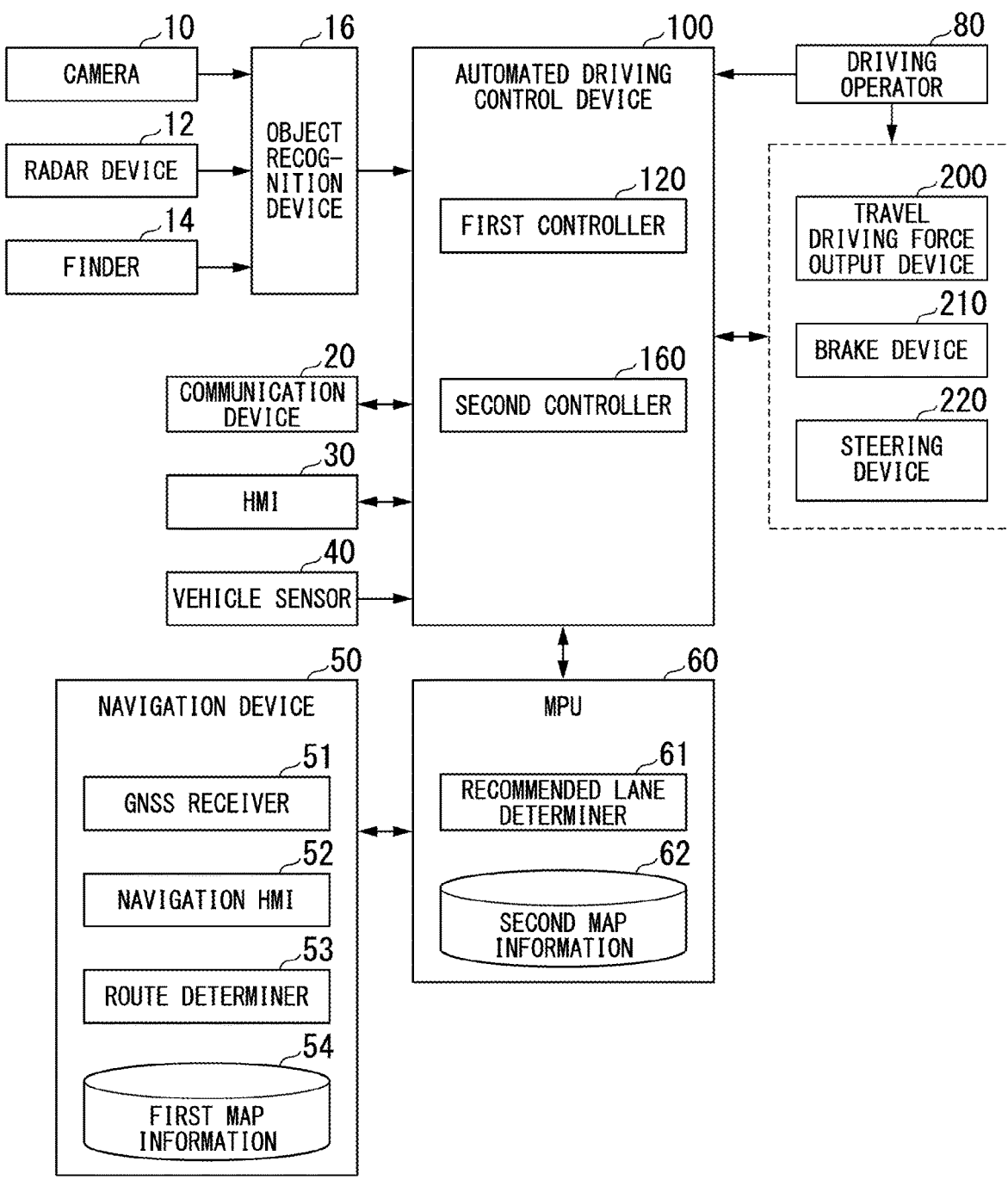
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle and a driving source thereof may include an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, an camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be further added.

The camera 10 is, for example, a digital camera using a solid-state imaging device such as a charge coupled device (CCD) or a complementary metal oxide semiconductor (CMOS). The camera 10 is attached to any place of a vehicle in which the vehicle system 1 is mounted (hereinafter, a host vehicle M). When a front view image is captured, the camera 10 is attached to an upper portion of a front windshield, a rear surface of a rearview mirror, or the like. For example, the camera 10 may periodically and repeatedly image the surroundings of the host vehicle M. The camera 10 may be a stereo camera or a 360-degree camera.

The radar device 12 radiates electric waves such as millimeter waves to the surroundings of the host vehicle M and detects electric waves (reflected waves) reflected by an object to detect at least the position (distance and direction) of the object. The radar device 12 is attached to any place on the host vehicle M. The radar device 12 may detect a position and a speed of an object according to a frequency modulated continuous wave (FM-CW) scheme.

The finder 14 is a light detection and ranging (LIDAR) device. The finder 14 radiates light to the surroundings of the host vehicle M and measures scattered light. The finder 14 detects a distance to a target on the basis of a time from light emission to light reception. The radiated light is, for example, pulsed laser light. The finder 14 is attached to any place on the host vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the automated driving control device 100. The object recognition device 16 may output the detection results of the camera 10, the radar device 12, and the finder 14 as they are to the automated driving control device 100. The object recognition device 16 may be omitted from the vehicle system 1.

The communication device 20 communicates with other vehicles or a parking area management device (which will be described later) present around the host vehicle M, or various server devices, for example, using a cellular network, a Wi-Fi network, Bluetooth (registered trademark), dedicated short range communication (DSRC), or the like.

The HMI 30 presents various types of information to an occupant of the host vehicle M and receives an input operation from the occupant. The HMI 30 includes various types of display devices, speakers, buzzers, touch panels, switches, keys, and the like. The HMI 30 may receive an instruction from a user through a manual operation of the user or receive an instruction from the user by recognizing the voice of the user.

The vehicle sensor 40 includes a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or complemented by an inertial navigation system (INS) using an output of the vehicle sensor 40. The navigation HMI 52 includes a display, a speaker, a touch panel, keys, and the like. The navigation HMI 52 may be partly or wholly shared with the HMI 30 described above. The route determiner 53, for example, determines a route (hereinafter, an on-map route) from the position of the host vehicle M identified by the GNSS receiver 51 (or any input position) to a destination input by an occupant using the navigation HMI 52 with reference to the first map information 54. The first map information 54 is, for example, information in which a road shape is represented by links indicating roads and nodes connected by the links. The first map information 54 may include curvatures, point of interest (POI) information, and the like of roads. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block with reference to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch place in the on-map route.

The second map information 62 is map information with higher accuracy than the first map information 54. The second map information 62 includes, for example, information on the centers of lanes or information on boundaries of the lanes, or the like. The second map information 62 may include road information, traffic regulations information, address information (addresses and zip codes), facility information, telephone number information, etc. The second map information 62 may be updated at any time through communication between the communication device 20 and other devices.

The driving operator 80 includes, for example, an accelerator pedal, a brake pedal, a shift lever, a steering wheel, a modified steering wheel, a joystick and other operators, for example. A sensor that detects an operation amount or presence or absence of an operation is attached to the driving operator 80 and a detection result thereof is output to the automated driving control device 100 or some or all of the travel driving force output device 200, the brake device 210 and the steering device 220.

The automated driving control device 100 includes a first controller 120 and a second controller 160, for example. The first controller 120 and the second controller 160 are realized by a hardware processor such as a central processing unit (CPU) executing a program (software), for example. Some or all of these components may be realized by hardware (circuit; including circuitry) such as a large scale integration (LSI) circuit, an application specific integrated circuit (ASIC), a field-programmable gate array (FPGA), or a graphics processing unit (GPU) or realized by software and hardware in cooperation. The program may be stored in a storage device (storage device including a non-transitory storage medium) such as an HDD, a flash memory, or the like of the automated driving control device 100 in advance or may be stored in a detachable storage medium such as a DVD or a CD-ROM and installed in the HDD or the flash memory of the automated driving control device 100 by the storage medium (non-transitory storage medium) being mounted in a drive device.

Figure 2:
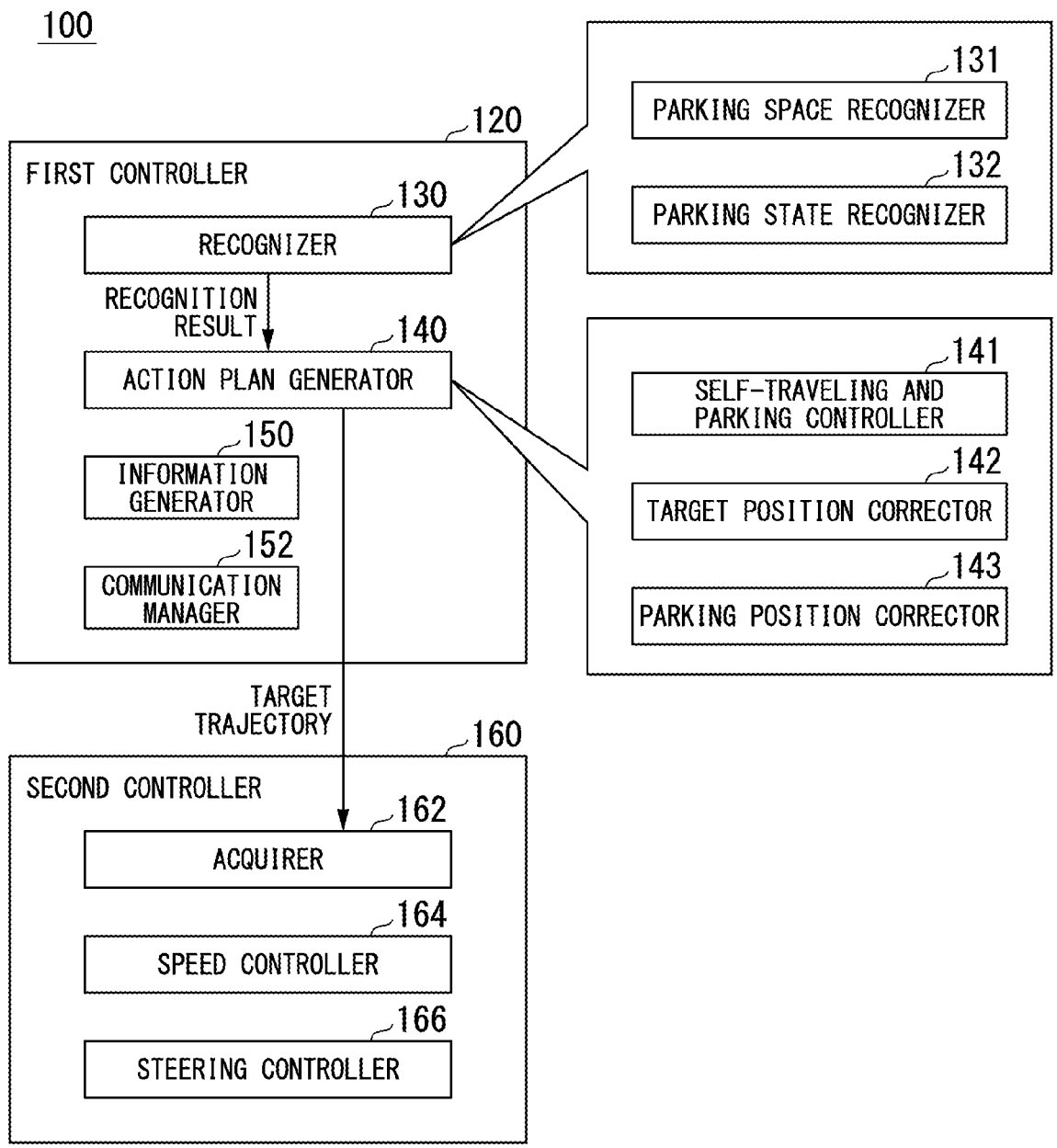
FIG. 2 is a functional configuration diagram of a first controller and a second controller.

FIG. 2 is a functional configuration diagram of the first controller 120 and the second controller 160. The first controller 120 includes, for example, a recognizer 130, an action plan generator 140, an information generator 150, and a communication manager 152. The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is guaranteed.

The recognizer 130 recognizes a state such as a position, a speed and an acceleration of an object around the host vehicle M on the basis of information input from the camera 10, the radar device 12, and the finder 14 via the object recognition device 16. The position of the object, for example, is recognized as a position at coordinates with a representative point (a centroid, a drive shaft center, or the like) of the host vehicle M as an origin, and is used for control. The position of the object may be represented by a representative point such as a centroid or a corner of the object or may be represented by an expressed region. The "state" of the object may include an acceleration or jerk of the object, or an "action state" (for example, whether lane change is being performed or is intended to be performed).

For example, the recognizer 130 recognizes a lane in which the host vehicle M is traveling (travel lane). For example, the recognizer 130 compares a pattern of a road marking line (for example, an arrangement of a solid line and a broken line) obtained from the second map information 62 with a pattern of a road marking line around the host vehicle M recognized from an image captured by the camera 10 to recognize the travel lane. The recognizer 130 may recognize not only the road marking lines but also a traveling road boundary (a road boundary) including road marking lines, a road shoulder, a curb, a median strip, a guard rail, or the like to recognize the travel lane. In this recognition, the position of the host vehicle M acquired from the navigation device 50 or a processing result of an INS may be additionally considered. The recognizer 130 recognizes a temporary stop line, an obstacle, a red light, a toll gate, and other road events.

The recognizer 130 recognizes a position or a posture of the host vehicle M with respect to a travel lane when recognizing the travel lane. The recognizer 130 may recognize, for example, a deviation of a reference point of the host vehicle M with respect to a center of the lane and an angle formed between a traveling direction of the host vehicle M and a line connecting the center of the lane as the relative position and posture of the host vehicle M with respect to the travel lane. Instead, the recognizer 130 may recognize, for example, a position of the reference point of the host vehicle M with respect to any one of side end portions (the road marking line or the road boundary) of the travel lane as the relative position of the host vehicle M with respect to the travel lane.

The recognizer 130 includes, for example, a parking space recognizer 131 and a parking state recognizer 132. These components start in a self-traveling and parking event which will be described later. This will be described in detail later.

The action plan generator 140 generates a target trajectory in which the host vehicle M will travel in a recommended lane determined by the recommended lane determiner 61 in principle, and the host vehicle M will travel automatically (without depending on a driver's operation) in the future such that it can cope with a surrounding situation. The target trajectory includes, for example, a speed element. For example, the target trajectory is represented as arrangement of points (trajectory points) that the host vehicle M is to reach in order. The trajectory point is a point that the host vehicle M is to reach for each predetermined traveling distance (for example, several [m]) along a road, and a target speed or a target acceleration at every predetermined sampling time (for example, every several tenths of a second) are separately generated as a part of the target trajectory. The trajectory points may be positions that the host vehicle M will reach at predetermined sampling times for each predetermined sampling time. In this case, information on the target speed or the target acceleration is represented as an interval between the trajectory points.

The action plan generator 140 may set an automated driving event upon generation of a target trajectory. The automated driving event includes a constant speed traveling event, a low-speed following traveling event, a lane change event, a branching event, a merging event, a takeover event, self-traveling and parking events for unmanned traveling and parking in valet parking and the like, and the like. The action plan generator 140 generates a target trajectory in response to a started event.

Hereinafter, an event of performing automated parking and automated exit according to guidance of a parking area management device 400 from among self-traveling and parking events will be represented as a self-traveling and parking event. Automated parking includes an operation of entering through an entrance of a parking area and traveling to a parking space through automated driving according to guidance, and an operation of parking in the parking space through automated driving according to guidance. Automated exit is an operation of traveling to an exit of a parking area, exiting the parking area and then parking in an area where an occupant boards a vehicle (e.g., a stopping area 310 which will be described later) through automated driving according to guidance. In automated driving according to guidance, the host vehicle M moves while sensing a route guided by the parking area management device 400 by itself, for example.

The parking area management device 400 is an example of a management device which manages a parking area and a management target thereof is not limited to the parking area. For example, any facility may be a management target if it is a facility in which a plurality of vehicles simultaneously pass through two or more points.

In automated driving according to guidance, for example, the parking area management device 400 may determine a parking space that is a target (hereinafter referred to as a first target parking space) and generate an approximate travel route to the first target parking space on the basis of a map in a parking area. In this case, the host vehicle M generates a target trajectory on the basis of the approximate travel route generated by the parking area management device 400. The approximate travel route includes, for example, links (passages) through which the host vehicle M passes to arrive at a target, a travel distance, the number of parking spaces which the host vehicle M passes, turning positions, turning directions (right turn, left turn, and the like), and the like and represents a route for traveling to a destination with reference to such information. For example, the approximate travel route may be represented as "advancing ∘∘ meters through xx passage and turning left," "advancing through a passage of link ID001 by X parking spaces, turning left and parking in the fifth parking space of a passage of link ID002" or the like.

Furthermore, in automated driving according to guidance, the parking area management device 400 may generate a target trajectory and the host vehicle M may travel along the target trajectory generated by the parking area management device 400. However, it is assumed that the parking area management device 400 generates an approximate travel route and the host vehicle M generates a target trajectory, as described above, in the following description.

The action plan generator 140 includes, for example, a self-traveling and parking controller 141 that starts when the self-traveling and parking event is executed, a target position corrector 142, and a parking position corrector 143. Functions of these components will be described in detail later. The parking position corrector 143 is a component functioning in a scene as in a second embodiment and will be described in detail in the second embodiment.

The second controller 160 controls the travel driving force output device 200, the brake device 210, and the steering device 220 such that the host vehicle M passes through a target trajectory generated by the action plan generator 140 at a scheduled time.

The second controller 160 includes, for example, an acquirer 162, a speed controller 164, and a steering controller 166. The acquirer 162 acquires information on the target trajectory (trajectory points) generated by the action plan generator 140 and stores the information on the target trajectory in a memory (not shown). The speed controller 164 controls the travel driving force output device 200 or the brake device 210 on the basis of a speed element included in the target trajectory stored in the memory. The steering controller 166 controls the steering device 220 according to a degree of curvature of the target trajectory stored in the memory. Processing of the speed controller 164 and the steering controller 166 is realized by, for example, a combination of feedforward control and feedback control. For example, the steering controller 166 may execute a combination of feedforward control according to a curvature of a road in front of the host vehicle M and feedback control based on a deviation of the host vehicle M with respect to the target trajectory.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and an electronic control unit (ECU) that controls these components. The ECU controls the aforementioned components according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of a brake pedal included in the driving operator 80 to the cylinder via a master cylinder, as a backup. The brake device 210 is not limited to the configuration described above and may be an electronically controlled hydraulic brake device that controls an actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

[Self-Traveling and Parking Event—at the Time of Entry]

Here, processing for causing the host vehicle M to be parked in the first target parking space in an automated parking event at the time of entry will be mainly described below and processing of generating parking state information will be described later.

Figure 3:
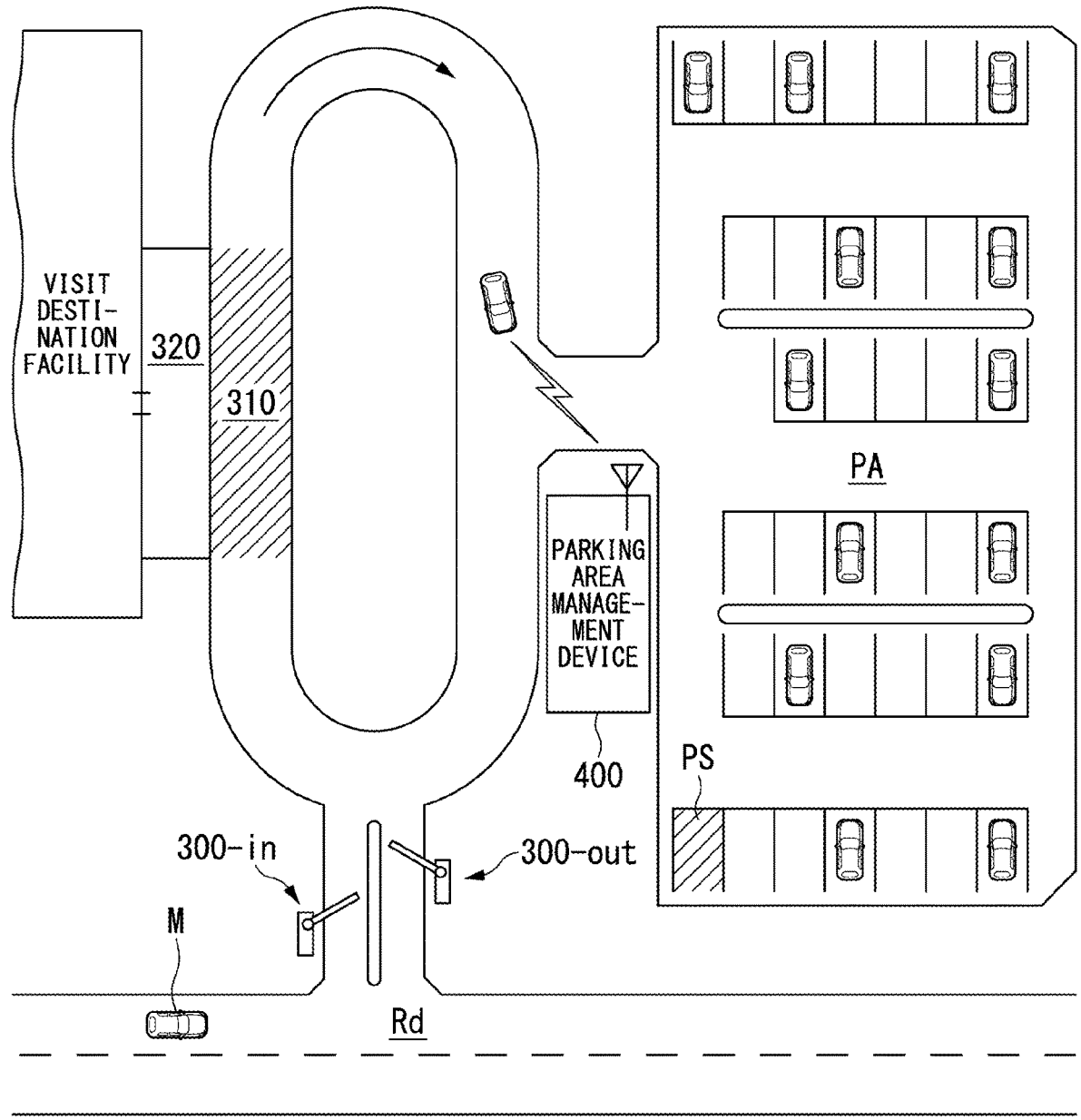
FIG. 3 is a diagram schematically showing a situation in which a self-traveling and parking event is executed.

The self-traveling and parking controller 141 causes the host vehicle M to be parked in a parking space on the basis of information acquired by the communication device 20 from the parking area management device 400, for example. FIG. 3 is a diagram schematically showing a situation in which the self-traveling and parking event is executed. Gates 300-in and 300-out are provided on a route from a road Rd to a visit destination facility. The host vehicle M passes through the gate 300-in and travels to the stopping area 310 through manual driving or automated driving. The stopping area 310 faces a boarding and alighting area 320 connected to the visit destination facility. An eave for avoidance of rain and snow is provided in the boarding and alighting area 320.

After the host vehicle M drops an occupant at the stopping area 310, the host vehicle M performs automated driving in an unmanned manner and starts a self-traveling and parking event in which the host vehicle M moves to a parking space PS in a parking area PA. A start trigger of the self-traveling and parking event may be an operation performed by a user or an owner of the host vehicle M using a terminal device of the user or the owner or reception of a predetermined signal from the parking area management device 400 in a wireless manner. For example, when a request for automated parking is received from the user of the host vehicle M using a terminal device, the parking area management device 400 instructs the host vehicle M to start the self-traveling and parking event on the basis of the information received from the terminal device and performs guidance for causing automated parking to be performed. Furthermore, a request for automated parking may be received using the HMI 30. For example, when the host vehicle M receives a request for automated parking from the user using the HMI 30, the host vehicle M may start the self-traveling and parking event and the parking area management device 400 performs guidance for causing automated parking to be performed.

When the self-traveling and parking event is started, the self-traveling and parking controller 141 controls the communication device 20 such that a parking request is transmitted to the parking area management device 400. Then, the host vehicle M moves from the stopping area 310 to the parking area PA according to guidance of the parking area management device 400 while performing sensing by itself. For example, an approximate route to the target parking space is indicated by the parking area management device 400 and the host vehicle M travels along the route indicated by the parking area management device 400 while performing sensing by itself.

Figure 4:
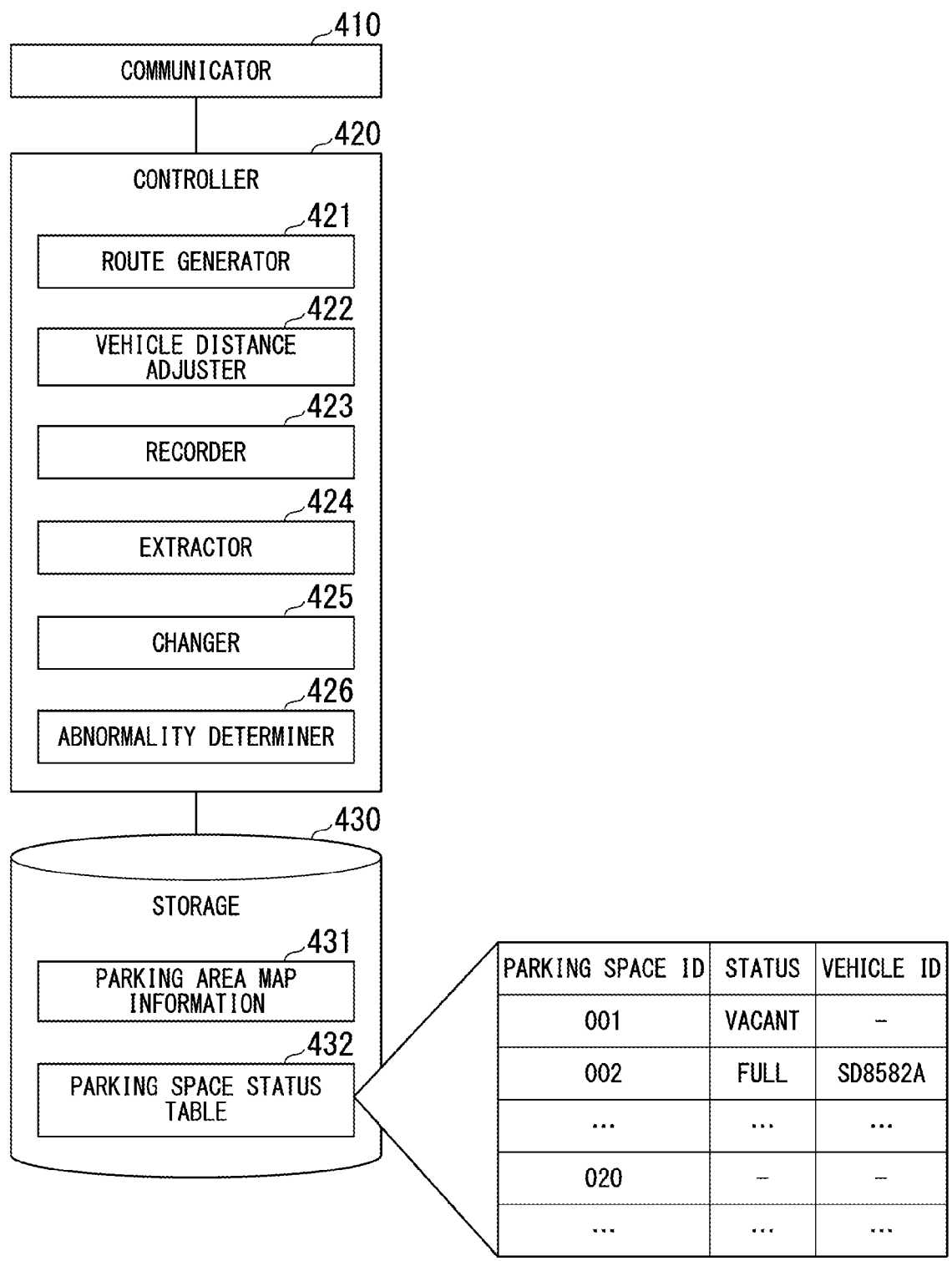
FIG. 4 is a diagram showing an example of a configuration of a parking area management device.

FIG. 4 is a diagram showing an example of a configuration of the parking area management device 400. The parking area management device 400 includes, for example, a communicator 410, a controller 420, and a storage 430. The storage 430 stores information such as parking area map information 431 and a parking space status table 432.

The communicator 410 wirelessly communicates with the host vehicle M or other vehicles. The controller 420 includes, for example, a route generator 421, a vehicle distance adjuster 422, a recorder 423, an extractor 424, a changer 425, and an abnormality determiner 426. The recorder 423, the extractor 424, the changer 425, and the abnormality determiner 426 will be described in detail later.

The route generator 421 guides a vehicle to a parking space PS on the basis of information acquired through the communicator 410 and information stored in the storage 430. For example, the route generator 421 may generate the aforementioned approximate route and transmit information representing the generated approximate route to the vehicle to guide the vehicle to the first target parking space.

The parking area map information 431 is information that geometrically represents a structure of the parking area PA. The parking area map information 431 includes coordinates, identification information and the like of each parking space PS. The parking space status table 432 is, for example, a table in which statuses indicating whether parking spaces PS have a vacant status or a full (parked) status and vehicle IDs that are identification information of parked vehicles when parking spaces have a full status are associated with parking space IDs that are identification information of the parking spaces PS. A parking space ID may be identification information of a parking space acquired by recognizing an indicating object provided in the aforementioned parking space PS or identification information allocated by the parking area management device 400 in a parking area in which an indicating object is not provided.

When the communicator 410 receives a parking request from a vehicle, the route generator 421 extracts a parking space PS having a vacant status with reference to the parking space status table 432, acquires the position of the extracted parking space PS from the parking area map information 431, generates a suitable approximate route to the acquired position of the parking space PS and transmits information representing the generated approximate route to the vehicle using the communicator 410.

The vehicle distance adjuster 422 instructs a specific vehicle to stop, move slowly, or the like as necessary such that vehicles do not simultaneously advance to the same position on the basis of positional relationships between a plurality of vehicles.

In the vehicle (which is assumed to be the host vehicle M hereinafter) that has received the information representing the approximate route from the parking area management device 400, the self-traveling and parking controller 141 generates a target trajectory based on the approximate route. When the host vehicle M approaches the parking space PS that is the target, the parking space recognizer 131 recognizes parking frame lines or the like that define the parking space PS, recognizes a detailed position of the parking space PS and provides the recognized detailed position to the self-traveling and parking controller 141. The self-traveling and parking controller 141 receives the detailed position of the parking space PS, corrects the target trajectory and causes the host vehicle M to be parked in the parking space PS.

[Self-Traveling and Parking Event—at the Time of Exit]

Here, processing for causing the host vehicle M to exit in an automated parking event at the time of exit will be mainly described below, and processing of generating parking state information is the same as processing at the time of entry and thus description thereof will be omitted.

The self-traveling and parking controller 141 and the communication device 20 are maintained in operating states even when the host vehicle M is parked. For example, the route generator 421 of the parking area management device 400 generates a route from a parking space PS to the stopping area 310 and transmits information representing the route to the host vehicle M when a pick-up request is received from the terminal device of the user, for example. When the information representing the route is received, the self-traveling and parking controller 141 of the host vehicle M causes the system of the host vehicle M to start and causes the host vehicle M to move to the stopping area 310 along the route. Here, the vehicle distance adjuster 422 of the parking area management device 400 instructs a specific vehicle to stop, move slowly or the like as necessary such that vehicles do not simultaneously advance to the same position on the basis of positional relations between a plurality of vehicles as at the time of entry. When the host vehicle M is caused to move to the stopping area 310 and drop the occupant, the self-traveling and parking controller 141 stop operating and then manual driving, or automated driving performed by another function is started.

[Self-Traveling and Parking Event—at the Time of Entry (when First Target Parking Space is Vacant)]

The parking state recognizer 132 recognizes indicating objects provided in the parking spaces PS while the host vehicle M is traveling. "Providing an indicating object" may include, for example, drawing a numeral, a letter or the like for identifying each parking space PS, embedding a sign on which numerals, letters or the like for identifying each parking space PS are drawn, and the like. "Providing in a parking space PS" may be provided within the area of the parking space PS or providing in a passage in front of the parking space PS or on a wall or a pillar around the parking space PS. The parking state recognizer 132 acquires identification information of each parking space PS (hereinafter referred to as parking space identification information) by recognizing the indicating object. For example, the parking state recognizer 132 may acquire the parking space identification information by performing image processing on a captured image of the indicating object.

The indicating object includes, for example, an object indicating a combination of a numeral and a letter for identifying each parking space PS, a two-dimensional code obtained by encoding a combination of numerals and letters for identifying this parking space PS, or the like. For example, the parking state recognizer 132 may acquire parking space identification information by recognizing an indicating object provided in a parking space PS adjacent to a passage (including lanes) in which the host vehicle M is traveling from among parking spaces PS provided in the parking area PA. When the parking space identification information has been acquired, the parking state recognizer 132 recognizes a parking state indicating whether another vehicle is parked in this parking space PS (i.e., the parking space PS adjacent to the route along which the host vehicle M is traveling). When it is recognized that another vehicle is parked in this parking space PS (i.e., when a parked vehicle is recognized), the parking state recognizer 132 recognizes numerals and letters indicated on the number plate of another vehicle parked in the parking space PS (parked vehicle).

When there is no indicating object provided in the parking spaces PS, the parking state recognizer 132 may recognize each parking space PS on the basis of parking frame lines or the like that define the parking spaces PS and recognize the positions of the recognized parking spaces PS. For example, the parking state recognizer 132 may recognize a parking space PS adjacent to a passage in which the host vehicle M is traveling from among parking spaces PS provided in the parking area PA. The parking state recognizer 132 may recognize that the recognized parking space PS is an nth parking space PS which the host vehicle M has passed while traveling along the approximate route indicated by the parking area management device 400 and that it is a parking space PS which the host vehicle M has passed when the host vehicle M has traveled ∘∘ km after entering the parking area PA. The parking state recognizer 132 recognizes a parking state of the parking space PS the position of which has been recognized. A parking state is information representing whether another vehicle is parked in a parking space PS that is a target.

When there is no indicating object provided in the parking spaces PS, the parking state recognizer 132 may recognize the position (e.g., a position represented by coordinates, a latitude and a longitude in a parking area map, or the like) of parking space PS parking frame lines which have been recognized on the basis of the position of the host vehicle M when parking frame lines have been recognized.

The parking state recognizer 132 may recognize a parked vehicle present in a parking space that is not a parking space adjacent to a passage in which the host vehicle M is traveling. For example, in the case of turning right before the end of the passage, a parked vehicle present in a parking space at the end of the passage may be recognized.

The information generator 150 generates parking state information representing the parking state of the parking space PS on the basis of the recognition result of the parking state recognizer 132 in the middle of traveling of the host vehicle M to the first target parking space. The information generator 150 may generate parking state information representing the parking state of the parking space PS on the basis of the recognition result of the parking state recognizer 132 while the host vehicle M is exiting the parking space PS. For example, the information generator 150 may generate parking state information for each recognized parking space PS. However, it is assumed that the parking state is recognized in the middle of traveling to the first target parking space as described above in the following description.

Parking state information includes, for example, information representing whether another vehicle is parked in a parking space PS which the host vehicle M has passed. For example, when a parked vehicle present in a parking space PS which the host vehicle M has passed is recognized by the parking state recognizer 132, the information generator 150 generates information representing that a parking state is "parked" and information representing identification information of the recognized parked vehicle (e.g., vehicle number). When a parked vehicle present in the parking space PS which the host vehicle M has passed is not recognized by the parking state recognizer 132, the information generator 150 generates information representing that a parking state is "no parking."

Parking state information may include information representing the position or identification information of a parking space PS in which presence or absence of parking of another vehicle is recognized by the parking state recognizer 132 (hereinafter referred to as specifying information). The specifying information is information for specifying each parking space by the position or identification information of each parking space PS. Each parking space is recognized by the recognizer 130 of each vehicle when the vehicles pass by. Hereinafter, an example in which the specifying information is parking space identification information will be described. The information generator 150 generates parking state information by associating parking space identification information acquired by the parking state recognizer 132 with information representing whether another vehicle is parked in the corresponding parking space PS.

When there is no indicating object provided in the parking space PS, the information generator 150 generates parking position information as the specifying information. For example, the information generator 150 may derive the passing order of the parking spaces PS recognized by the parking state recognizer 132 when the host vehicle M passes the parking spaces PS and generate parking position information representing the derived order. The information generator 150 may derive a distance that the host vehicle M has traveled from when the host vehicle M entered the parking area PA to when a parking space PS has been recognized by the parking state recognizer 132 when the host vehicle M is passing the parking space PS and generate parking position information representing the derived distance for each parking space. The information generator 150 may acquire a position of the host vehicle M specified by the navigation device 50 when a parking space is recognized by the parking state recognizer 132 when the host vehicle M passes the parking space and generate parking position information representing the acquired position of the host vehicle M for each parking space.

The communication manager 152 transmits the information generated by the information generator 150 to the parking area management device 400 using the communication device 20. For example, the communication manager 152 may transmit parking state information generated by the information generator 150 to the parking area management device 400 whenever the parking state information is generated (for each parking space PS).

When the host vehicle M approaches the first target parking space, the parking space recognizer 131 recognizes parking frame lines that define the parking spaces PS, recognizes the detailed position of the first target parking space and provides the detailed position to the self-traveling and parking controller 141.

When the host vehicle M is caused to be parked in the first target parking space, the information generator 150 generates parking completion information. For example, the information generator 150 may generate parking completion information in which the vehicle ID thereof is associated with identification information representing the first target parking space indicated by the parking area management device 400. The communication manager 152 transmits the parking completion information generated by the information generator 150 to the parking area management device 400 using the communication device 20.

Figure 5:
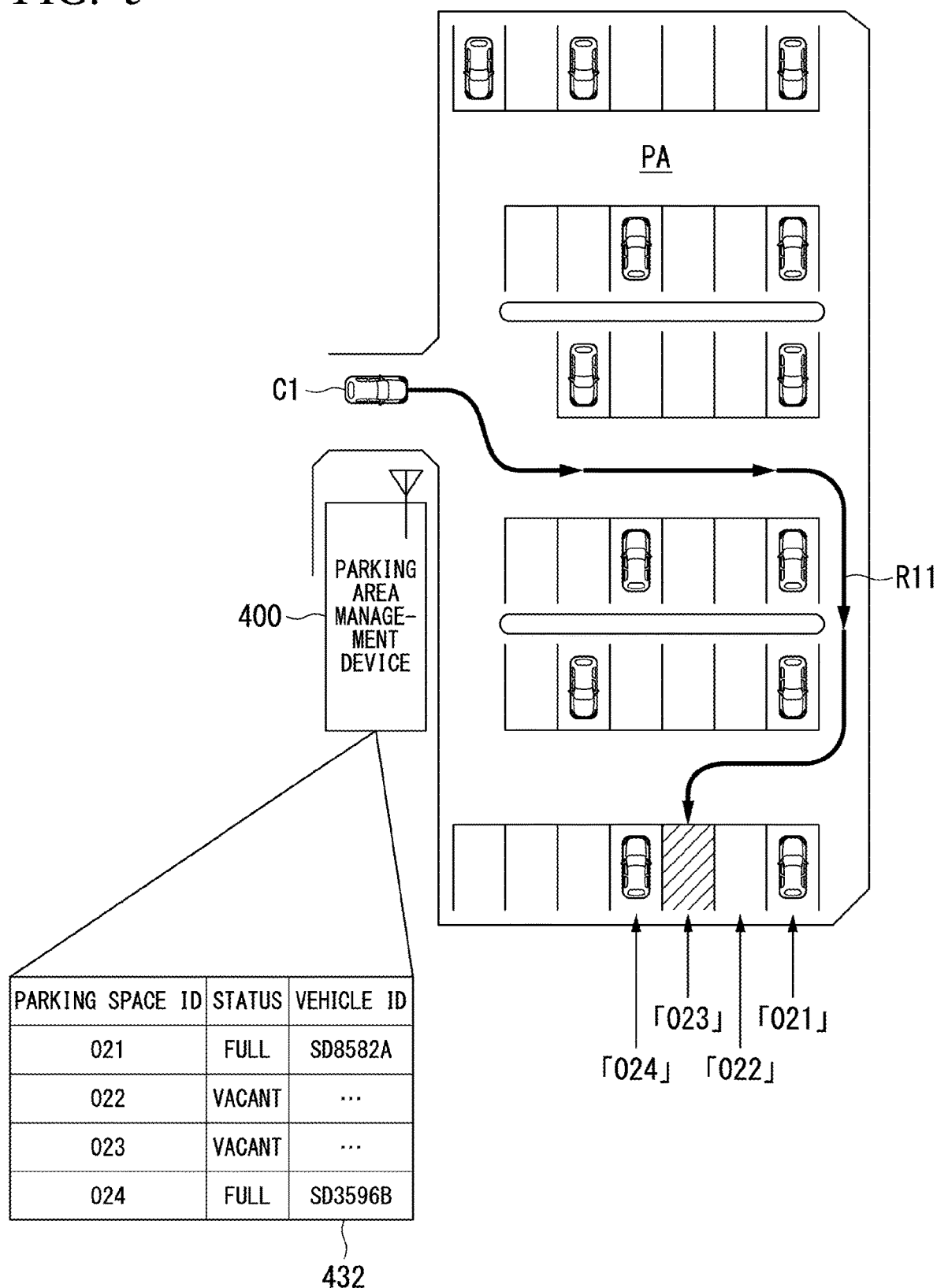
FIG. 5 is a diagram schematically showing an example of a route of a first vehicle.

FIG. 5 is a diagram schematically showing an example of a guiding route for a first vehicle C1. The guiding route for the first vehicle C1 indicated by the parking area management device 400 is a route R11 directed to the first target parking space (ID: "0023"). A parking state is as shown in the parking space status table 432. In the parking space status table 432, a parking space (ID: "0021") and a parking space (ID: "0024") have a full status, whereas a parking space (ID: "0022") and the parking space (ID: "0023") have a vacant status. Actual parking states are also consistent with the status managed through the parking space status table 432.

When the first vehicle C1 approaches the parking space (ID: "0023"), the first vehicle C1 recognizes parking frame lines that define the parking space (ID: "0023") and corrects a target trajectory on the basis of a result of recognition of the detailed position of the parking space (ID: "0023"). However, it is assumed that the first vehicle C1 misrecognizes parking frame lines that define a neighboring parking space (ID: "0022") as a target parking space. In this case, the first vehicle C1 is parked in the parking space (ID: "0022").

The first vehicle C1 generates parking completion information in which the vehicle ID thereof is associated with information representing the first target parking space indicated by the parking area management device 400 and transmits the generated parking completion information to the parking area management device 400. For example, the first vehicle C1 generates parking completion information representing that parking of the vehicle having the vehicle ID of "C1" in the parking space (ID: "0023") is completed and transmits the generated parking completion information to the parking area management device 400. Since the first target parking space is indicated by the parking area management device 400, the first target parking space may not be included in the parking completion information. In this case, the first vehicle C1 associates the vehicle ID thereof with information representing that parking is completed and transmits the associated information to the parking area management device 400.

Then, the parking area management device 400 writes information representing that the parking space (ID: "0023") has a full status and the parked vehicle is the first vehicle C1 in the parking space status table 432 using the vehicle ID. Subsequently, the parking area management device 400 determines the first target parking space of a second vehicle C2 as the parking space (ID: "0022") with reference to the parking space status table 432, generates a route of the second vehicle C2 and transmits the generated route to the second vehicle C2.

Figure 6:
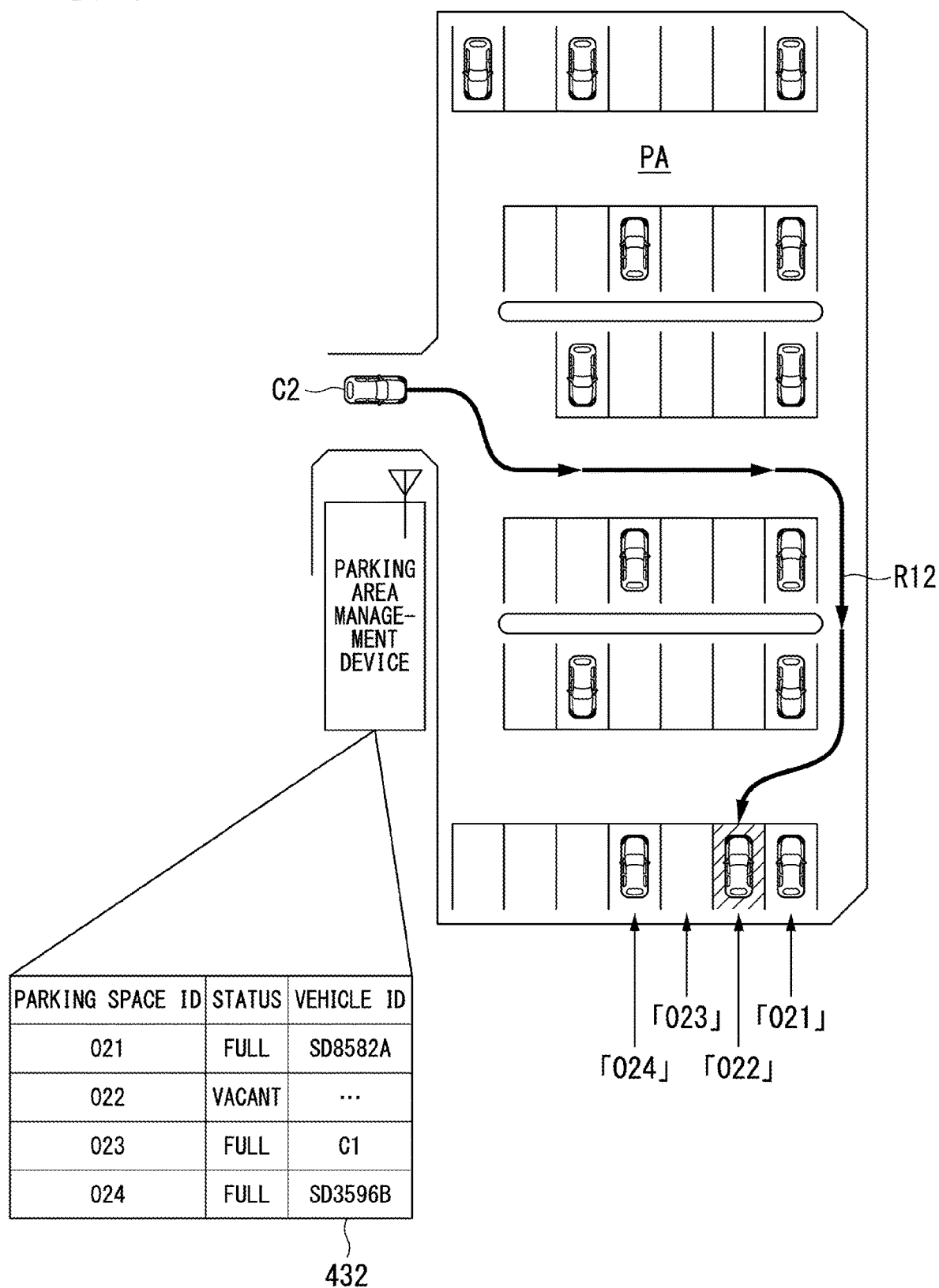
FIG. 6 is a diagram schematically showing an example of a route of a second vehicle.

FIG. 6 is a diagram schematically showing an example of a guiding route for the second vehicle C2. The guiding route for the second vehicle C2 is a route R12 directed to the first target parking space (ID: "0022"). As described above, in the parking space status table 432, the parking space (ID: "0022") has a vacant status and the parking space (ID: "0023") has a full status. However, an actual parking state is that the parking space (ID: "0022") has a full status and the parking space (ID: "0023") has a vacant status, as shown in FIG. 6. Accordingly, the second vehicle C2 automatedly travels along the route R12 and recognizes that the first vehicle C1 is parked in the first target parking space (ID: "0022") when arriving at a region near the first target parking space (ID: "0022"). Accordingly, the second vehicle C2 performs automated corrected parking for correcting the target parking space.

When another vehicle is parked in the first target parking space, the target position corrector 142 searches parking spaces PS near the first target parking space for a second target parking space in which another vehicle is not parked on the basis of a recognition result of the parking state recognizer 132. The target position corrector 142 corrects the target trajectory such that it is directed to the found second target parking space and causes the host vehicle M to be parked in the second target parking space on the basis of a recognition result of the parking space recognizer 131.

For example, the second vehicle C2 generates erroneous parking information when the first vehicle C1 present in the first target parking space (ID: "0022") is recognized. The erroneous parking information includes, for example, identification information of another vehicle recognized to be parked in the first target parking space and represents that another vehicle is parked in the first target parking space that is supposed to have a vacant status.

When parking in the second target parking space is completed, the second vehicle C2 generates parking completion information representing that parking in the second target parking space is completed. In this example, the second vehicle C2 generates parking completion information representing that parking of the vehicle having the vehicle ID "C2" in the parking space (ID: "0023") is completed. The second vehicle C2 transmits the generated erroneous parking information and parking completion information to the parking area management device 400.

[Parking Area Management Device—Change Processing]

The extractor 424 extracts a parking space PS in which a parking state managed by the parking area management device 400 differs from an actual parking state on the basis of parking state information received from a vehicle with reference to the parking space status table 432. For example, when erroneous parking information is received, the extractor 424 extracts a parking space PS included in the erroneous parking information as a parking space PS in which a managed parking state differs from an actual parking state. Furthermore, the extractor 424 may extract a parking space PS different from an actual parking state indicated by parking state information as a parking space PS in which a managed parking state differs from an actual parking state with reference to the parking space status table 432.

When the extractor 424 extracts a parking space different from an actual parking state, the changer 425 changes the parking state of the extracted parking space in the parking space status table 432. The changer 425 rewrites the parking state managed by the parking area management device 400 as the actual parking state.

The changer 425 determines whether there is a vehicle having, as the first target parking space, a parking space having a parking state different from the actual parking state and thus changed in the parking space status table 432. When there is a vehicle having a parking space for which the parking state in the parking space status table 432 has been changed as the first target parking space, the changer 425 changes the target of this vehicle to a third target parking space. For example, the changer 425 determines, as the third target parking space, a parking space in which no other vehicle is parked from among parking spaces near the first target parking space. When there are a plurality of parking spaces in which no other vehicles are parked, the changer 425 determines, as the third target parking space, a parking space which is closest to the first target parking space and in which no other vehicle is parked.

The abnormality determiner 426 determines whether an abnormality occurs on the basis of an extraction result of the extractor 424. An abnormality includes, for example, a temporary defect such as an abnormality that was temporarily generated in the system but was recovered from. Although illustration is omitted, there is a case in which no parked vehicle is present in the parking space (ID: "0024") in a parking state managed by the parking area management device 400 but a parked vehicle is actually present in the parking space (ID: "0024"), for example. In this case, the parking area management device 400 is likely to be in a situation in which parking completion information cannot be received from the vehicle and a situation in which parking completion information cannot be reflected in the table. The abnormality determiner 426 determines that an abnormality has occurred when a parked vehicle that is not present in a parking state managed by the parking area management device 400 is actually parked in a parking space.

[Self-Traveling and Parking Event—at the Time of Entry (when First Target Parking Space has Full Status)]

When another vehicle is recognized in the first target parking space, the target position corrector 142 specifies a parking space PS (hereinafter referred to as a second target parking space) in which no other vehicle is parked on the basis of a result of recognition of parking states of parking spaces adjacent to the first target parking space. The target position corrector 142 generates a target trajectory for parking in the specified second target parking space and causes the host vehicle M to be parked in the second target parking space.

Figure 7:
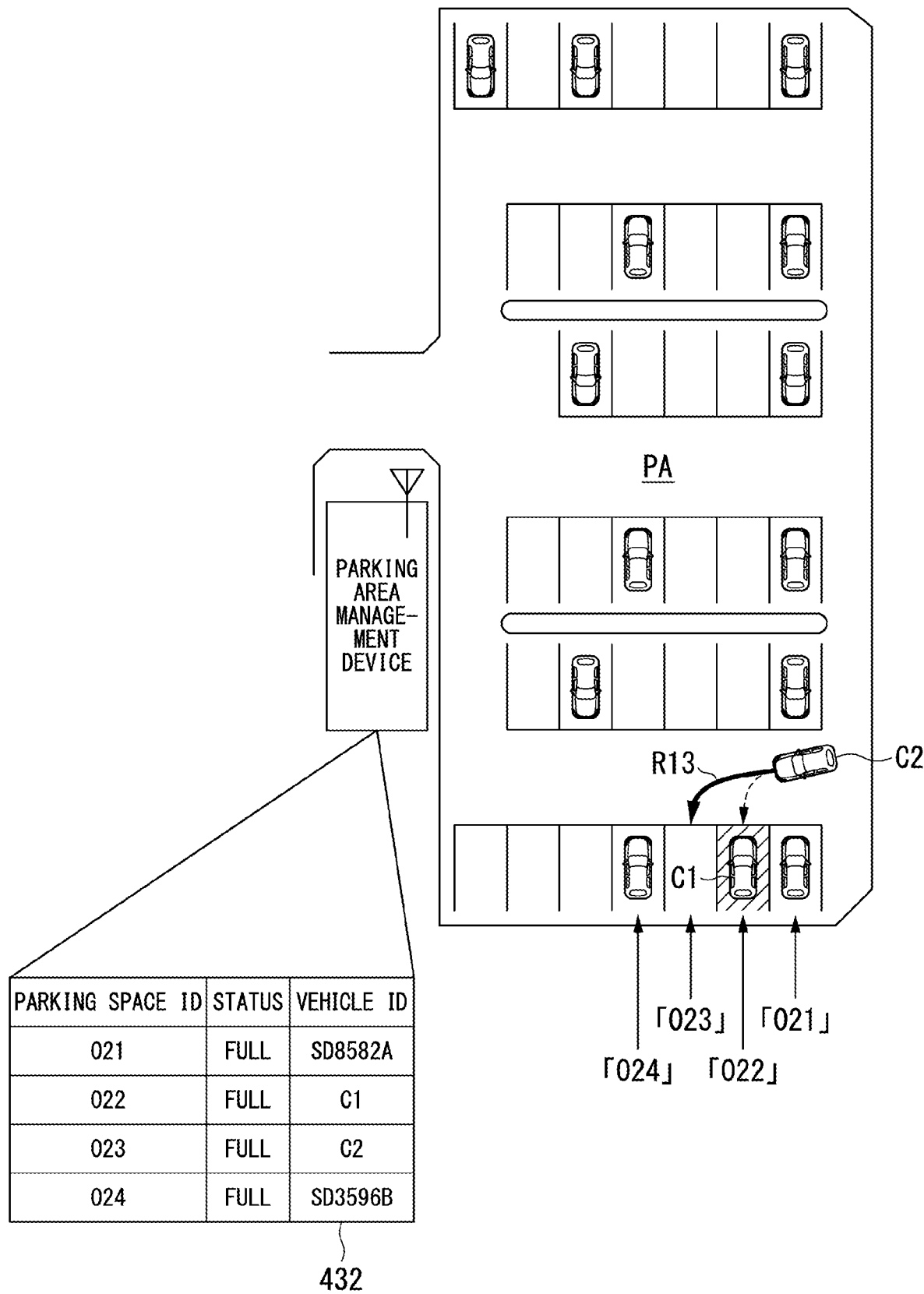
FIG. 7 is a diagram schematically showing an example of automated corrected parking of the second vehicle.

FIG. 7 is a diagram schematically showing an example of automated corrected parking of the second vehicle C2. The second vehicle C2 recognizes the parking state of the parking space (ID: "0023") adjacent to the first target parking space (ID: "0022") as a vacant status in which there no parked vehicle. The second vehicle C2 determines the parking space (ID: "0023") as the second target parking space, generates a target trajectory along a route R13 for parking in the second target parking space and is parked therein.

When the second vehicle C2 recognizes the parking space (ID: "0022"), the second vehicle C2 recognizes the vehicle number "C1" of the first vehicle C1 parked in the parking space (ID: "0022") and generates erroneous parking information representing that the vehicle having the vehicle ID of "C1" is parked in the parking space (ID: "0022"). After completion of parking in the second target parking space, the second vehicle C2 generates parking completion information representing that parking of the vehicle having the vehicle ID of "C2" in the parking space (ID: "0023") is completed. The second vehicle C2 transmits the generated erroneous parking information and parking completion information to the parking area management device 400. The second vehicle C2 may sequentially transmit the erroneous parking information and the parking completion information at the generation timings thereof or simultaneously transmit the erroneous parking information and the parking completion information at the same timing.

Then, the parking area management device 400 writes information representing that the parking space (ID: "0022") has a full status and the vehicle parked therein is the first vehicle C1 in the parking space status table 432. The parking area management device 400 rewrites the vehicle ID associated with the parking space (ID: "0023") from "C1" to "C2."

[Self-Traveling and Parking Event—at the Time of Entry (in Case of Vehicle Having High Outside Detection Performance)]

The route generator 421 of the parking area management device 400 may generate a guiding route such that a distance to the first target parking space is longer for a vehicle having high outside detection performance (hereinafter, a high-performance vehicle) than that for a vehicle having low outside detection performance (hereinafter, a general vehicle). For example, the route generator 421 receives information representing an outside detection performance of a vehicle from each vehicle and determines that a vehicle which satisfies high-performance vehicle conditions defined in advance as a vehicle having high outside detection performance. The high-performance vehicle conditions defined in advance include, for example, a condition that an accuracy of recognition of the surroundings of a vehicle (e.g., a camera resolution, other sensor accuracy, and the like) is equal to or greater than a threshold value). Information representing the outside detection performance of a vehicle may be transmitted from each vehicle to the parking area management device 400 or transmitted from a device that detects the outside detection performance of a passing vehicle to the parking area management device 400 when the device is provided in the parking area PA.

For example, the route generator 421 selects a parking space closest to the entrance of the parking area PA as the first target parking space of a general vehicle and selects a parking space farthest from the entrance of the parking area PA as the first target parking space of a high-performance vehicle. Furthermore, the route generator 421 may select the same parking space PS as the first target parking space for both a general vehicle and a high-performance vehicle, set a route to the first target parking space to a shortest route for a general vehicle, and set it to a detour route for a high-performance vehicle.

Figure 8:
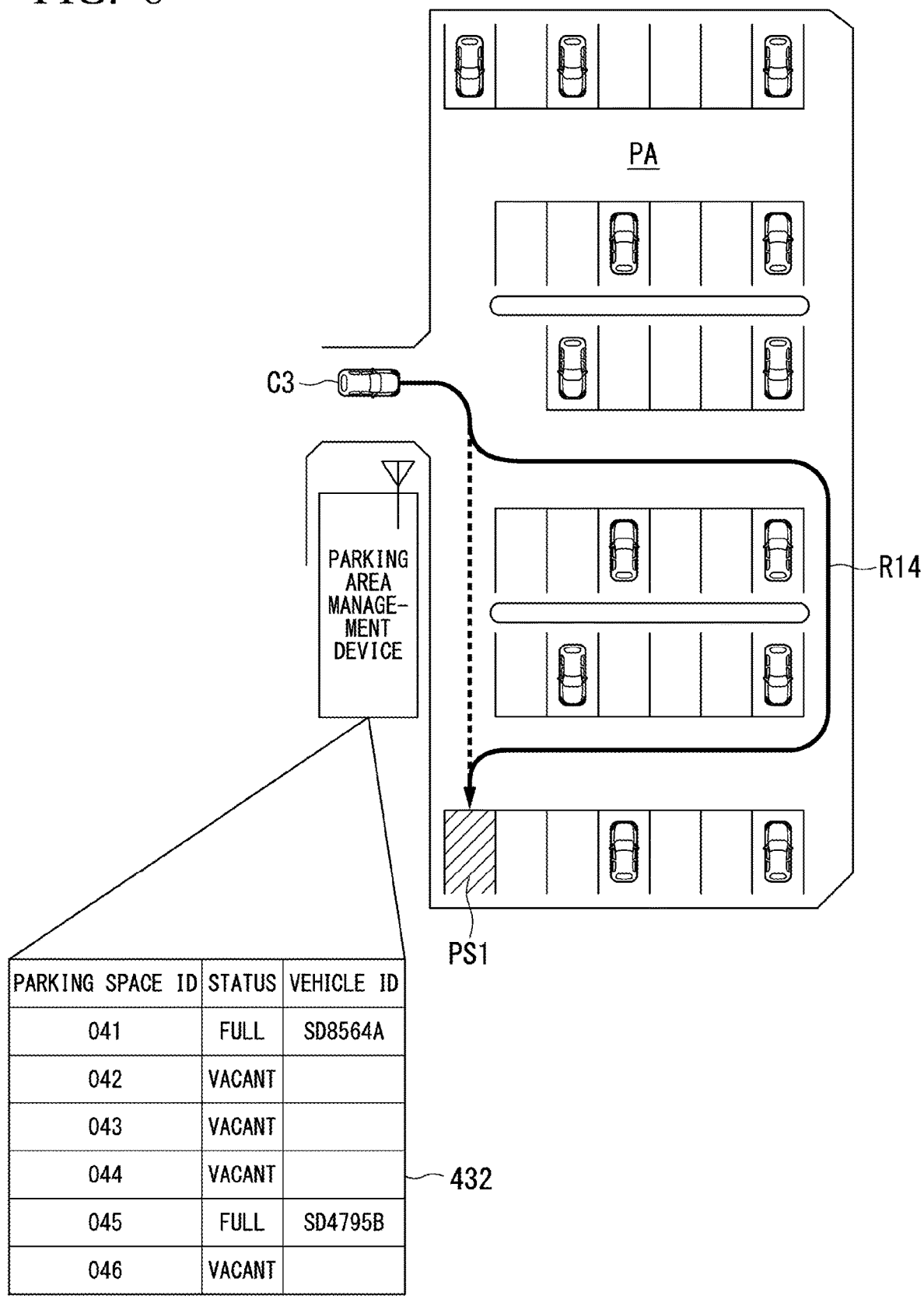
FIG. 8 is a diagram schematically showing an example of a route of a third vehicle.

FIG. 8 is a diagram schematically showing an example of a guiding route for a third vehicle C3. The third vehicle C3 is an example of a high-performance vehicle. In the figure, a route denoted by a broken line is a route of a shortest distance to the first target parking space (PS1) of the third vehicle C3. The parking area management device 400 generates a route R14 as a guiding route for the third vehicle C3 instead of the route of the shortest distance. For example, the third vehicle C3 generates parking state information with respect to all of left and right parking spaces PS which the third vehicle C3 passes when traveling along the route R14 and transmits the parking state information to the parking area management device 400.

[Flowchart]

Figure 9:
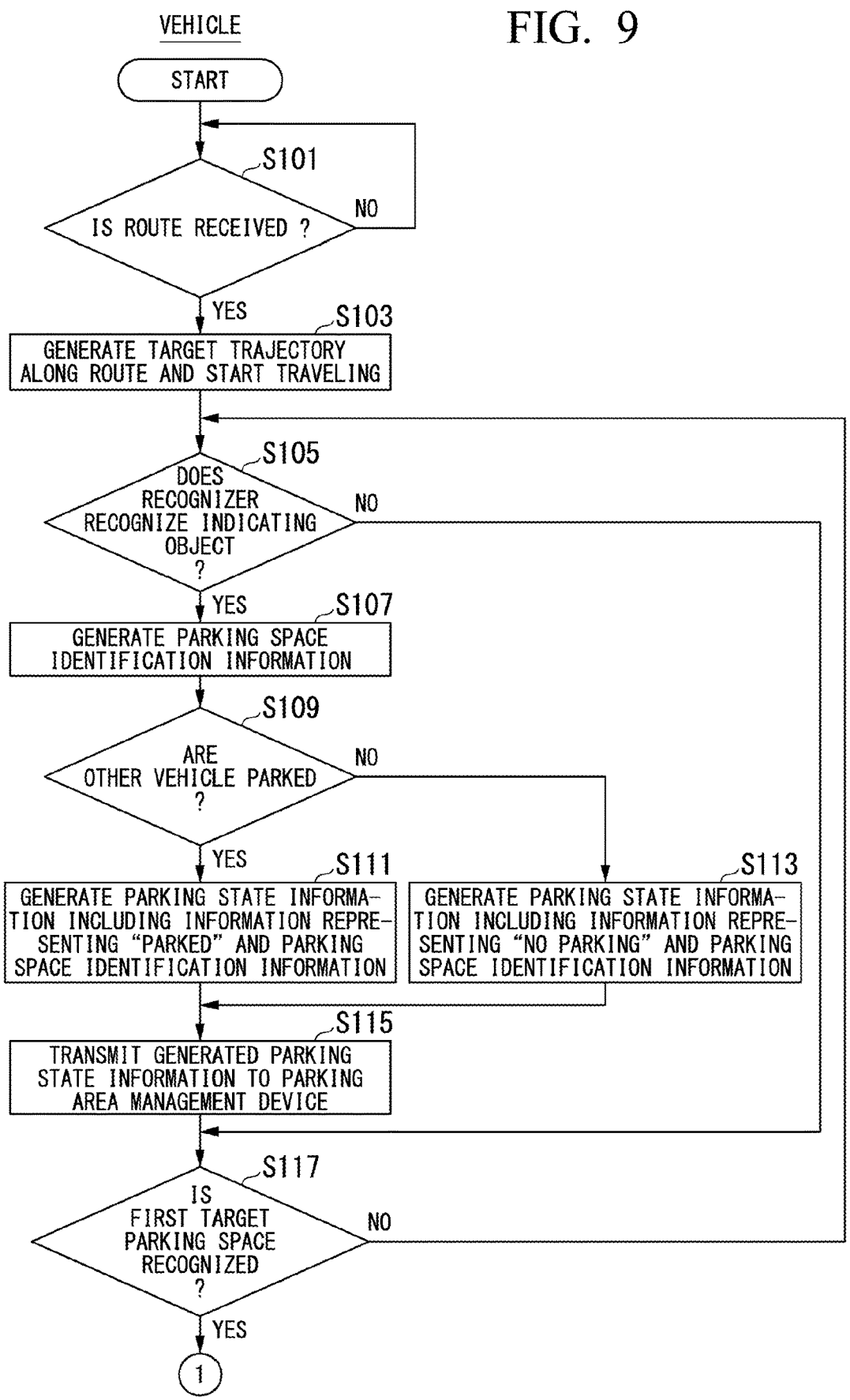
FIG. 9 is a flowchart showing an example of processing executed in the vehicle system.

FIG. 9 is a flowchart showing an example of processing executed in the vehicle system 1. First, the self-traveling and parking controller 141 determines whether information representing a guiding route is received from the parking area management device 400 (step S101). When the information representing the guiding route is received, the self-traveling and parking controller 141 generates a target trajectory along the guiding route and causes the host vehicle M to travel along the generated target trajectory (step S103). Subsequently, when the parking state recognizer 132 recognizes an indicating object provided in a parking space PS adjacent to a passage in which the host vehicle M is traveling (step S105), the parking state recognizer 132 outputs the recognition result to the information generator 150. When the parking state recognizer 132 does not recognize an indicating object provided in a parking space PS adjacent to the passage in which the host vehicle M is traveling, processing proceeds to step S117 which will be described later. The information generator 150 generates parking space identification information on the basis of the recognition result of the parking state recognizer 132 (step S107).

Subsequently, the parking state recognizer 132 determines whether another vehicle is parked in the parking space PS for which the parking space identification information is generated (step S109). When another vehicle is parked in the parking space PS for which the parking space identification information is generated, the information generator 150 generates parking state information including information representing that a parking state is "parked", identification information of the recognized parked vehicle (e.g., a vehicle number), and parking space identification information (step S111). On the other hand, when another vehicle is not parked in the parking space PS for which the parking space identification information is generated in step S109, the information generator 150 generates parking state information including information representing that a parking state is "no parking", identification information of the recognized parked vehicle (e.g., a vehicle number), and parking space identification information (step S113).

The communication manager 152 transmits the parking state information generated in step S111 or the parking state information generated in step S113 to the parking area management device 400 using the communication device 20 (step S115).

Subsequently, the parking space recognizer 131 determines whether parking frame lines of the first target parking space are recognized (step S117). When the parking frame lines of the first target parking space are not recognized, processing is returned to step S105 and repeated. On the other hand, when the parking frame lines of the first target parking space are recognized, the parking space recognizer 131 proceeds to processing shown in FIG. 10.

Figure 10:
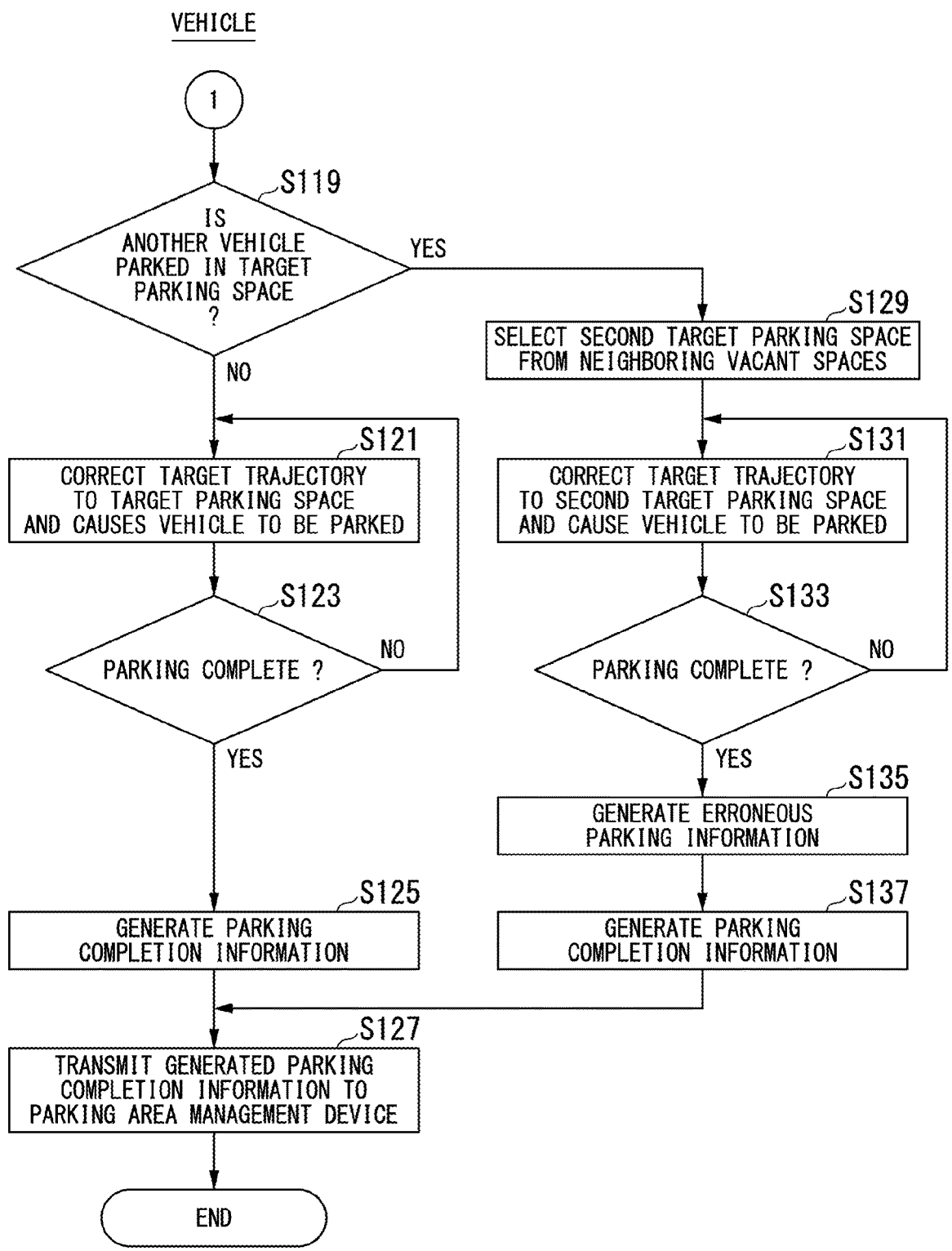
FIG. 10 is a flowchart showing an example of a processing procedure shown in FIG. 9.

FIG. 10 is a flowchart showing an example of processing procedure shown in FIG. 9. When the parking frame lines of the first target parking space are recognized, the parking state recognizer 132 determines whether another vehicle is parked in the first target parking space (step S119). When the parking state recognizer 132 recognizes that no other vehicle is parked in the first target parking space, the self-traveling and parking controller 141 corrects the target trajectory on the basis of the recognition result of the parking space recognizer 131 and causes the host vehicle M to be parked in the first target parking space (step S121). Then, when parking is completed (step S123), the information generator 150 generates parking completion information (step S125) and the communication manager 152 transmits the generated parking completion information to the parking area management device 400 (step S127).

The parking state recognizer 132 acquires parking space identification information by recognizing an indicating object provided in a parking space PS and determines whether the parking space is the first target parking space on the basis of the acquired parking space identification information. When no indicating object is provided in the parking space PS, the parking state recognizer 132 may recognize the position of the parking space and determine whether the parking space is the first target parking space on the basis of the recognized position of the parking space.

On the other hand, when it is recognized that another vehicle is parked in the first target parking space in step S119, the target position corrector 142 selects the second target parking space in which no other vehicle is parked from parking spaces PS near the first target parking space on the basis of the recognition result of the parking state recognizer 132 (step S129). The target position corrector 142 corrects the target trajectory such that it is directed to the selected second target parking space and causes the host vehicle M to be parked in the second target parking space (step S131). Subsequently, when parking is completed (step S133), the information generator 150 generates erroneous parking information (step S135) and generates parking completion information (step S137). Then, the communication manager 152 transmits the generated erroneous parking information and parking completion information to the parking area management device 400 (step S127).

Figure 11:
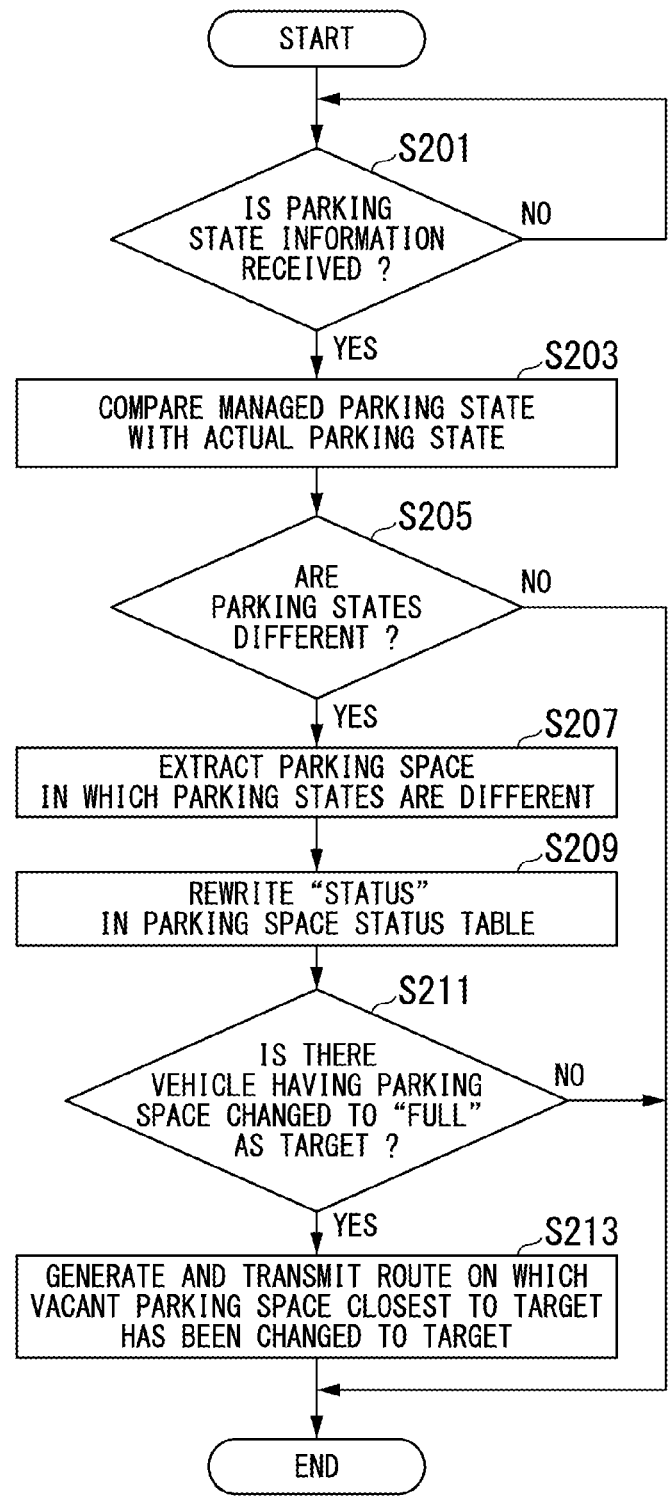
FIG. 11 is a flowchart showing an example of processing executed in the parking area management device.

FIG. 11 is a flowchart showing an example of processing executed in the parking area management device 400. The parking area management device 400 executes processing below, for example, for each parking space which a vehicle passes or for each piece of parking state information. First, the extractor 424 determines whether parking state information is received using the communicator 410 (step S201). The extractor 424 repeats the process of step S201 until parking state information is received.

For example, a vehicle recognizes parking states of parking spaces PS which the vehicle passes during traveling to the first target parking space and transmits parking state information to the parking area management device 400. When the parking state information is received, the extractor 424 compares parking states managed by the parking area management device 400 with actual parking states represented by the parking state information with reference to the parking space status table 432 (step S203). When the managed parking states differ from the actual parking states (step S205), the extractor 424 extracts a parking space PS having an actual parking state different from a managed parking state on the basis of the comparison result (step S207). Then, the changer 425 changes the parking state ("status" in the parking space status table 432) managed by the parking area management device 400 to the actual parking state for the extracted parking space PS (step S209).

Subsequently, the changer 425 determines whether there is a vehicle currently traveling along a guiding route having the parking space PS changed to a parking state of "full" from a parking state of "vacant" in step S209 as the first target parking space (step S211). For example, information representing whether each parking space PS is set to the first target parking space at the present time, the vehicle ID of a vehicle that is performing automated parking in the first target parking space, and the like may be included in the parking space status table 432. The changer 425 determines whether the parking space PS changed to a parking state of "full" from a parking state of "vacant" has been set to the first target parking space in the parking space status table 432.

When there is a vehicle traveling along the guiding route having the parking space PS changed to a parking state of "full" from a parking state of "vacant" as the first target parking space, the changer 425 determines, as the third target parking space, a parking space PS in which no other vehicle is parked from among parking spaces near the first target parking space changed to a parking state of "full" from a parking state of "vacant." Then, the changer 425 changes the target of the object vehicle to the third target parking space (step S213).

In this manner, a parking space in which a parking state managed in the parking space status table 432 differs from an actual parking state within the parking area PA can be extracted even when sufficient numbers of cameras and high-performance sensors are not installed in the parking area PA. When a parking state managed in the parking space status table 432 is different from an actual parking state, the managed parking state can be corrected to the actual parking state. Accordingly, it is possible to enhance the accuracy of parking states managed in the parking space status table 432 without improving the performance of facilities of a parking area.

Since a vehicle that performs automated parking or automated exit can generate parking state information on the basis of a recognition result of the recognizer 130 and transmit the parking state information to the parking area management device 400, it is possible to curb cost increase as compared to a case in which new cameras and sensors are installed in the parking area PA.

It is possible to improve the accuracy of parking states managed in the parking space status table 432 because the parking area management device 400 receives, from a vehicle heading for the first target parking space, parking state information with respect to all parking spaces PS which the vehicle has passed through passages adjacent to the parking spaces PS.

Summary of Embodiment

As described above, the vehicle control device of the present embodiment can easily acquire a parking state and notify a management device of the parking state by including a communicator which communicates with a management device that guides a vehicle capable of performing automated traveling to a target parking space with reference to management information representing parking states of a plurality of parking spaces, a recognizer which recognizes a surrounding state of the vehicle, and a generator which generates parking state information including information representing whether other vehicles are parked in parking spaces which the vehicle passes on the basis of a result recognized by the recognizer and causes the parking state information to be transmitted to the management device using the communicator. The parking area management device 400 can correctly manage parking states of parking spaces in valet parking by using parking state information acquired from vehicles.

Although an example in which the communication manager 152 transmits generated parking state information to the parking area management device 400 has been described, the generated parking state information may be transmitted to a parked vehicle and the parked vehicle may transmit the parking state information to the parking area management device 400. For example, when a parking space PS which the host vehicle M passes is recognized, the communication manager 152 transmits parking space identification information (or parking position information) of the recognized parking space PS to a fourth vehicle parked in the recognized parking space PS instead of transmitting parking state information to the parking area management device 400. The fourth vehicle transmits information in which the received parking position information is associated with the vehicle ID thereof to the parking area management device 400. The parking area management device 400 determines whether the position of the parking space PS in which the fourth vehicle is actually parked is consistent with the position of a parking space PS managed in the parking space status table 432 on the basis of the information received from the fourth vehicle. When the positions of the two parking spaces PS are not consistent with each other, the changer 425 changes the parking state managed by the parking area management device 400 to the actual parking state. In this manner, the actual parking state can be uploaded from the parked fourth vehicle to the parking area management device 400 to reduce a communication load of the host vehicle M during automated parking.

Second Embodiment

In the above-described first embodiment, an example in which the parking area management device 400 changes the parking space status table 432 on the basis of parking state information received from a vehicle has been described. In the second embodiment, an example in which a parking state is corrected at the side of a vehicle and the parking space status table 432 is not changed in the parking area management device 400 when the vehicle has been erroneously parked in a target different from a guidance of the parking area management device 400 will be described. With exception of this point, detailed description of the same contents as those in the first embodiment will be omitted and different contents will be described below.

Figure 12:
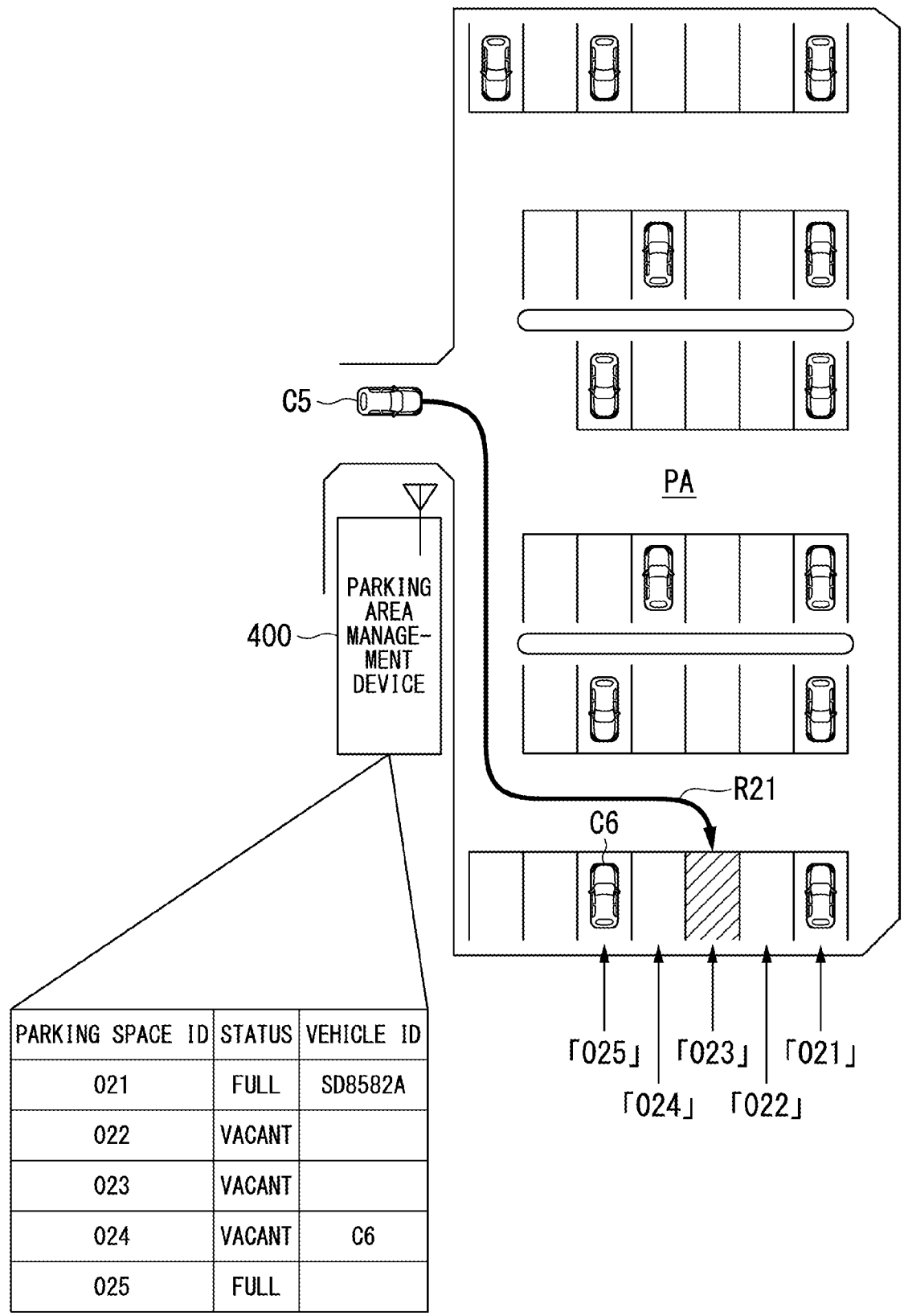
FIG. 12 is a diagram schematically showing an example of a route of a fifth vehicle.

FIG. 12 is a diagram schematically showing an example of a guiding route of a fifth vehicle C5. The fifth vehicle C5 is scheduled to travel along a route R21 and to be automatedly parked in the first target parking space (ID: "0023") according to guidance of the parking area management device 400. The fifth vehicle C5 generates parking space identification information indicating a parking space (ID: "0025") when passing by the parking space (ID: "0025") and recognizes that a sixth vehicle C6 is parked in the parking space (ID: "0025"). In this case, the fifth vehicle C5 transmits the generated parking space identification information to the sixth vehicle C6. Although an example in which the fifth vehicle C5 generates parking space identification information with respect to a parking space recognized when the fifth vehicle C5 passes thereby will be described below, the present invention is not limited thereto. For example, the fifth vehicle C5 may generate parking position information representing each parking space when passing thereby.

Subsequently, the fifth vehicle C5 generates parking space identification information indicating a parking space (ID: "0024") when passing by the parking space (ID: "0024") and recognizes that no other vehicle is parked in the parking space (ID: "0024"). In this case, the fifth vehicle C5 generates parking state information including the generated parking space identification information and information representing that a parking state is "no parking" and transmits the generated parking state information to the parking area management device 400.

When the parking space identification information is received from the fifth vehicle C5, the sixth vehicle C6 reads, from a storage thereof, identification information of the first target parking space guided by the parking area management device 400 when automatedly parked and compares the read identification information of the first target parking space with the received parking space identification information. In this example, the identification information of the first target parking space of the sixth vehicle C6 is "0024" and the parking space identification information received from the fifth vehicle C5 is "0025." The sixth vehicle C6 moves to the first target parking space when the identification information of the first target parking space is not consistent with the parking space identification information received from the fifth vehicle C5. That is, the sixth vehicle C6 exits the parking space (ID: "0025") in which it is parked and moves to the neighboring parking space (ID: "0024").

When specifying information for specifying a parking space PS using a position or identification information is received from another vehicle, the parking position corrector 143 determines whether the parking space specified by the specifying information received from the other vehicle is consistent with the first target parking space designated by the parking area management device 400. When it is determined that the specified parking space is consistent with the first target parking space, the parking position corrector 143 does not correct the parking position of the host vehicle M. On the other hand, when it is determined that the specified parking space is not consistent with the first target parking space, the parking position corrector 143 causes the host vehicle M to be automatedly parked such that the parking position of the host vehicle M is corrected to the first target parking space designated by the parking area management device 400. That is, the parking position corrector 143 causes the host vehicle M to move to the initial first target parking space.

Figure 13:
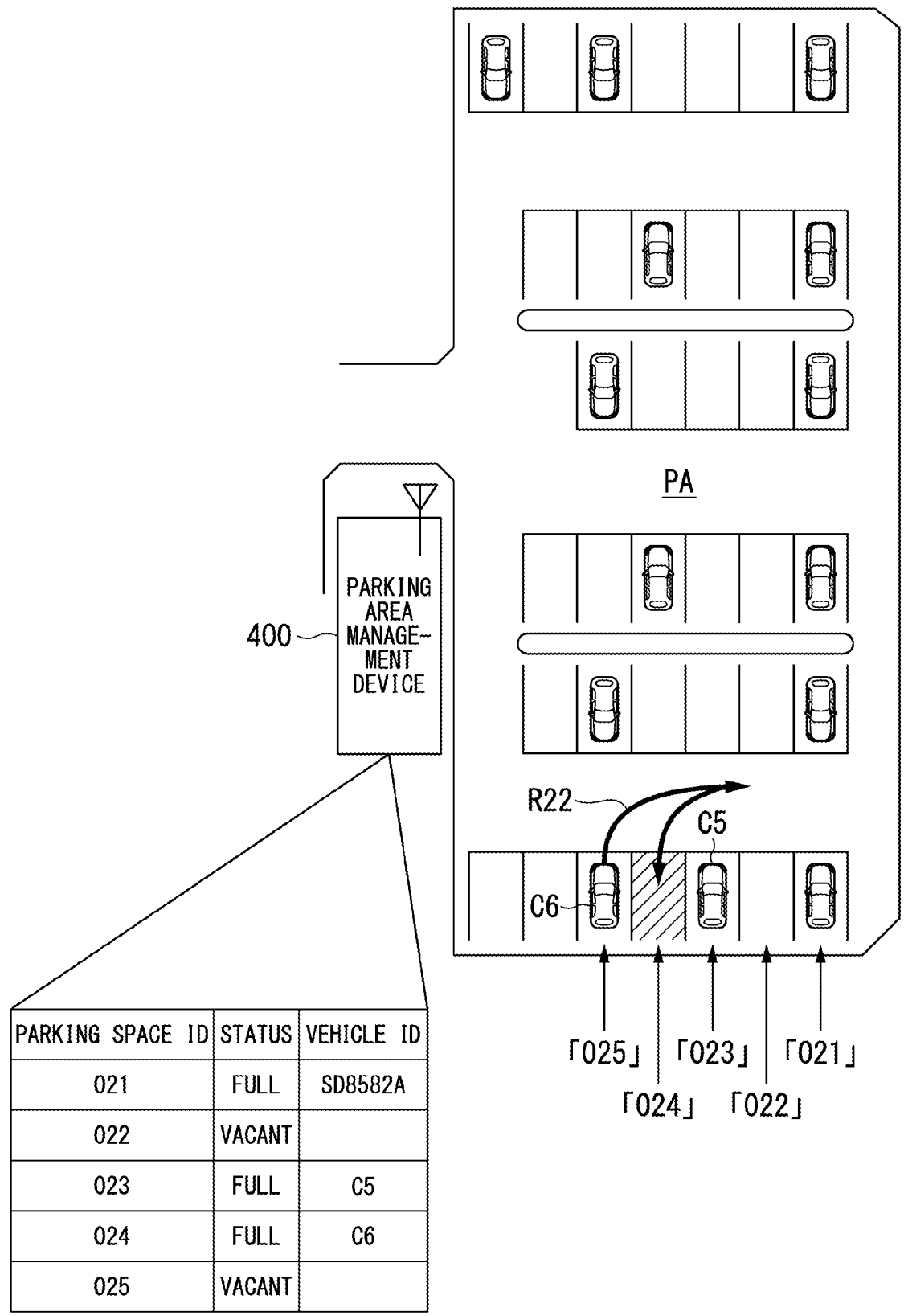
FIG. 13 is a diagram schematically showing an example of a corrected route of a sixth vehicle.

FIG. 13 is a diagram schematically showing an example of a corrected route of the sixth vehicle C6. The parking position corrector 143 of the sixth vehicle C6 determines the position of a parking space to which the sixth vehicle C6 will move based on the position of the parking space in which the sixth vehicle C6 is currently parked on the basis of specifying information of the parking space received from the fifth vehicle C5 and the first target parking space designated by the parking area management device 400. In the illustrated example, the sixth vehicle C6 determines that the parking space (ID: "0024") is on the right of the parking space (ID: "0025") in which the sixth vehicle C6 is currently parked and is a correct parking space (the first target parking space). The sixth vehicle C6 generates a route R22 through which it exits the parking space (ID: "0025") in which it is currently parked and parks in the parking space (ID: "0024") on the right of the current parking space. When parking in the parking space (ID: "0024") is completed, the sixth vehicle C6 generates correction information and transmits the correction information to the parking area management device 400. The correction information includes, for example, specifying information for specifying the parking space in which the vehicle has been erroneously parked before movement (correction) and specifying information for specifying the parking space in which the vehicle is parked after movement (correction).

[Flowchart]

Figure 14:
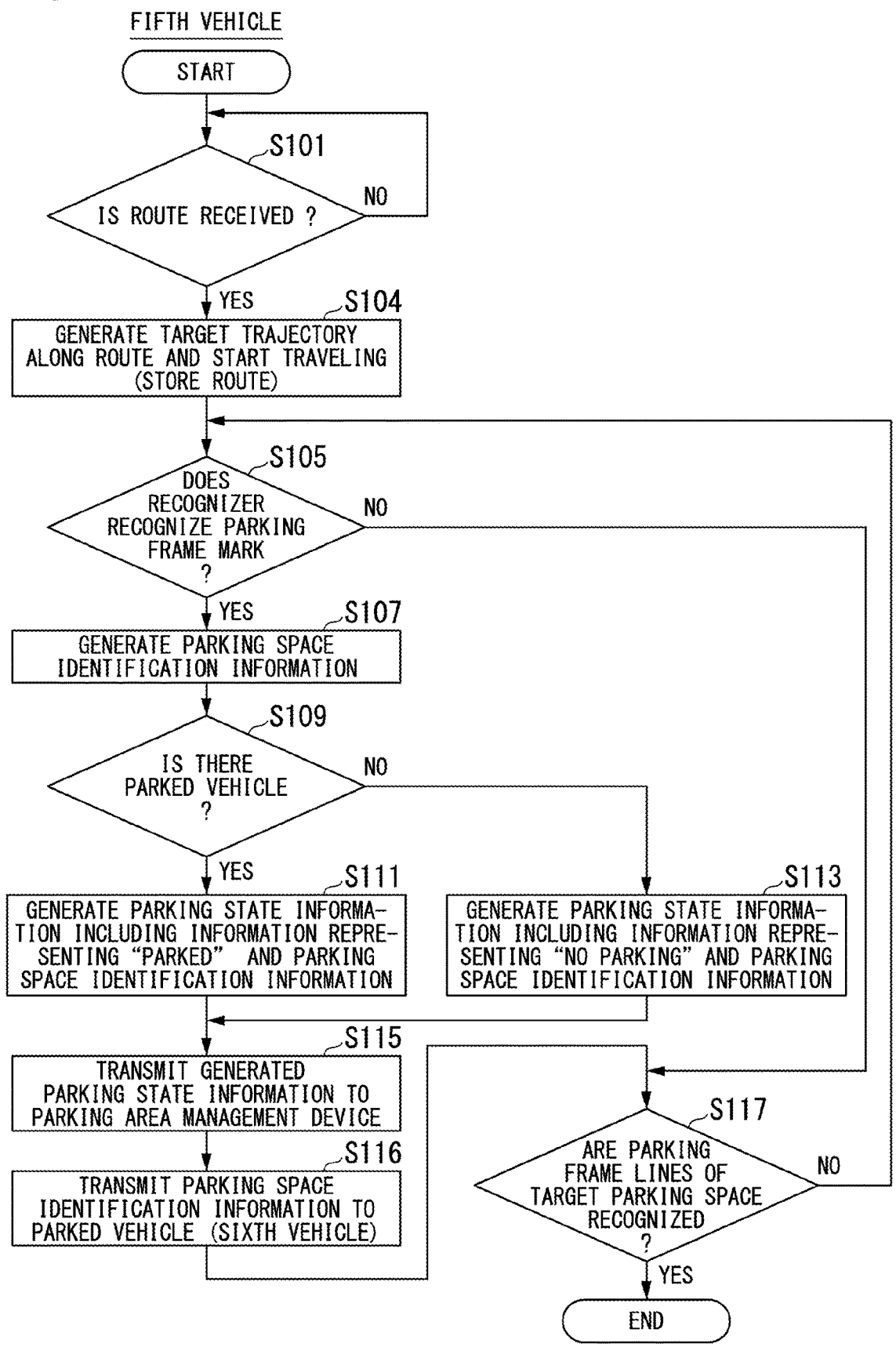
FIG. 14 is a flowchart showing an example of processing executed in the fifth vehicle.

FIG. 14 is a flowchart showing an example of processing executed in the fifth vehicle C5. The same processes as those described with reference to FIG. 9 are denoted by the same symbols. First, the self-traveling and parking controller 141 of the fifth vehicle C5 determines whether information representing a route is received from the parking area management device 400 (step S101). When the information representing the route is received, the self-traveling and parking controller 141 of the fifth vehicle C5 stores, in the storage thereof, the received information about the route (including information representing the first target parking space and a distance), generates a target trajectory along the route and causes the fifth vehicle C5 to travel through the generated target trajectory (step S104).

Subsequently, when the parking frame lines of the parking space PS (ID: "0025") are recognized (step S105), the parking state recognizer 132 of the fifth vehicle C5 outputs the recognition result to the information generator 150. The information generator 150 of the fifth vehicle C5 generates parking space identification information of the parking space PS (ID: "0025") on the basis of the recognition result of the parking state recognizer 132 (step S107).

Subsequently, the parking state recognizer 132 of the fifth vehicle C5 determines whether another vehicle is parked in the parking space PS (ID: "0025") for which the parking space identification information is generated (step S109). Since the sixth vehicle C6 is parked in the parking space PS for which the parking space identification information is generated, the information generator 150 of the fifth vehicle C5 generates parking state information including information representing that a parking state is "parked," identification information of the recognized parked vehicle (e.g., vehicle number), and parking space identification information (step S111). Then, the communication manager 152 of the fifth vehicle C5 transmits the parking state information generated in step S111 to the parking area management device 400 using the communication device 20 (step S115).

Subsequently, the communication manager 152 of the fifth vehicle C5 transmits the parking space identification information generated in step S107 to the sixth vehicle C6 using the communication device 20 (step S116). The parking space recognizer 131 of the fifth vehicle C5 determines whether the parking frame lines of the first target parking space are recognized (step S117). When the parking frame lines of the first target parking space are not recognized, processing returns to step S105 and repeated. On the other hand, when the parking frame lines of the first target parking space are recognized, the parking space recognizer 131 of the fifth vehicle C5 proceeds to processing shown in FIG. 10.

Figure 15:
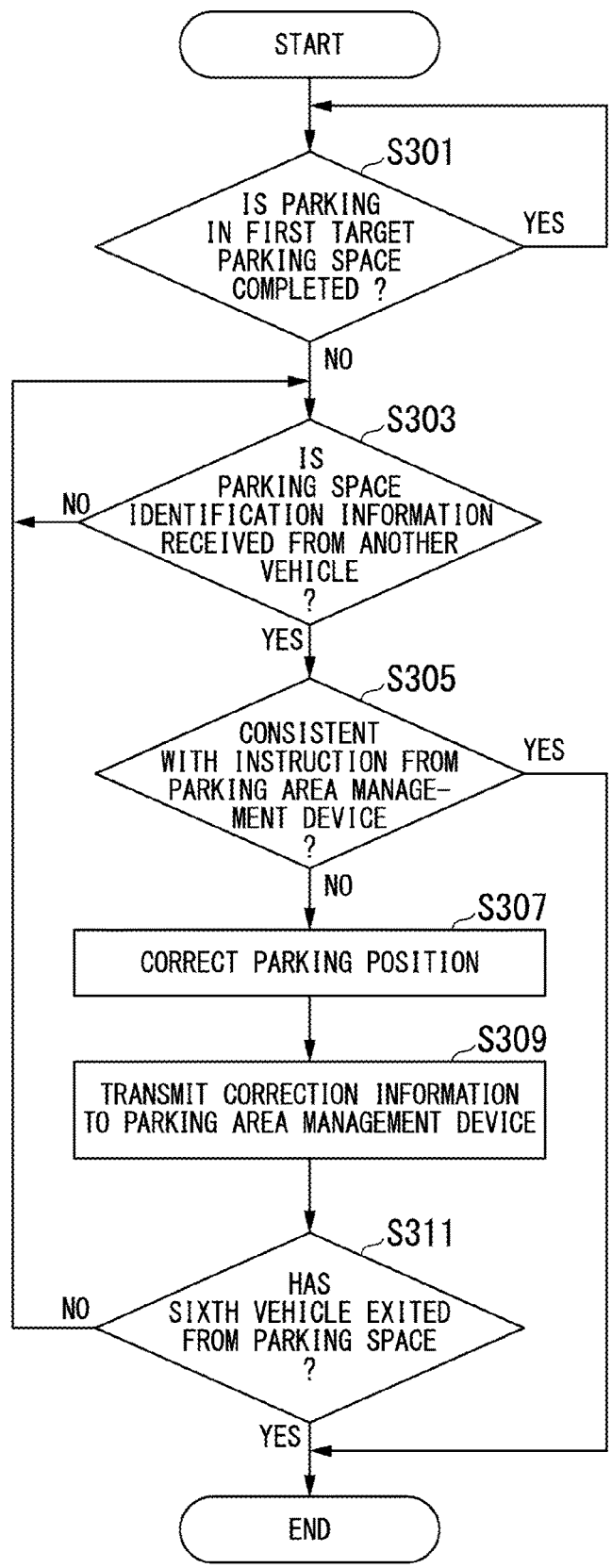
FIG. 15 is a flowchart showing an example of processing executed in the sixth vehicle.

FIG. 15 is a flowchart showing an example of processing executed in the sixth vehicle C6. The self-traveling and parking controller 141 of the sixth vehicle C6 determines whether parking in the first target parking space is completed (step S301). When parking in the first target parking space is completed, the parking position corrector 143 of the sixth vehicle C6 determines whether parking space identification information is received from other vehicles (step S303). In this example, the sixth vehicle C6 receives parking space identification information from the fifth vehicle C5 and determines whether the identification information of the first target parking space is consistent with the parking space identification information received from the fifth vehicle C5 (step S305). In this example, since the identification information of the first target parking space of the sixth vehicle C6 is "0024" and the parking space identification information received from the fifth vehicle C5 is "0025," the parking position corrector 143 of the sixth vehicle C6 determines that they are not consistent with each other.

Then, the parking position corrector 143 of the sixth vehicle C6 corrects the parking position to the first target parking space (step S307). That is, the sixth vehicle C6 exits the parking space (ID: "0025") in which it is parked and moves to the neighboring parking space (ID: "0024"). Then, the information generator 150 generates correction information and the communication manager 152 transmits the generated correction information to the parking area management device 400 (step S309). In this example, the information generator 150 of the sixth vehicle C6 generates correction information including specifying information (ID: "0025") that specifies the parking space before movement (correction) and specifying information (ID: "0024") that specifies the parking space after movement (correction). Subsequently, the self-traveling and parking controller 141 of the sixth vehicle C6 determines whether the sixth vehicle C6 has exited from the parking space (step S311). When the sixth vehicle C6 has not exited from the parking space, processing returns to step S303 and repeated. On the other hand, when the sixth vehicle C6 has exited from the parking space, processing ends.

Figure 16:
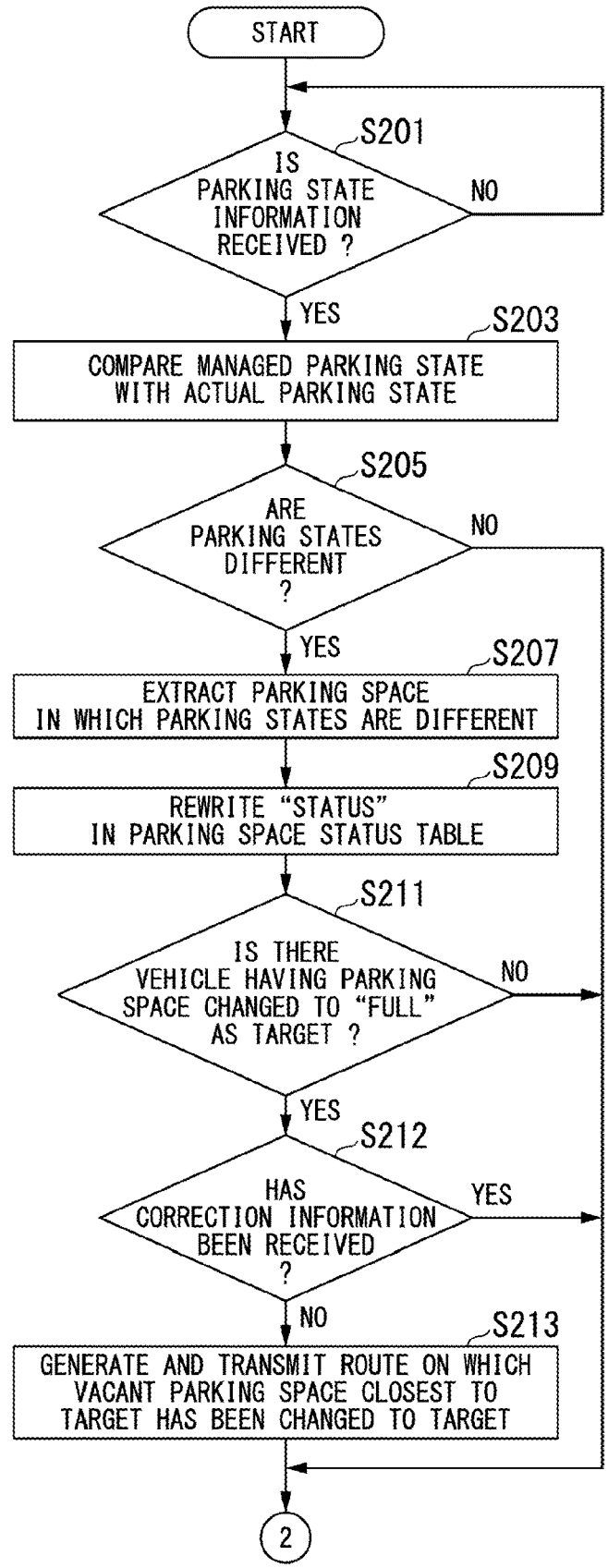
FIG. 16 is a flowchart showing another example of processing executed in the parking area management device.

FIG. 16 is a flowchart showing another example of processing executed in the parking area management device 400. The same contents as those described with reference to FIG. 11 are denoted by the same symbols and detailed description thereof is omitted. When it is determined that a vehicle scheduled to be parked in a parking space PS having a parking state changed from "vacant" to "full" is present in step S211, the changer 425 determines whether correction information with respect to the parking space PS having the parking state changed from "vacant" to "full" is received (step S212). When the correction information is not received, the changer 425 proceeds to processing of FIG. 17.

Figure 17:
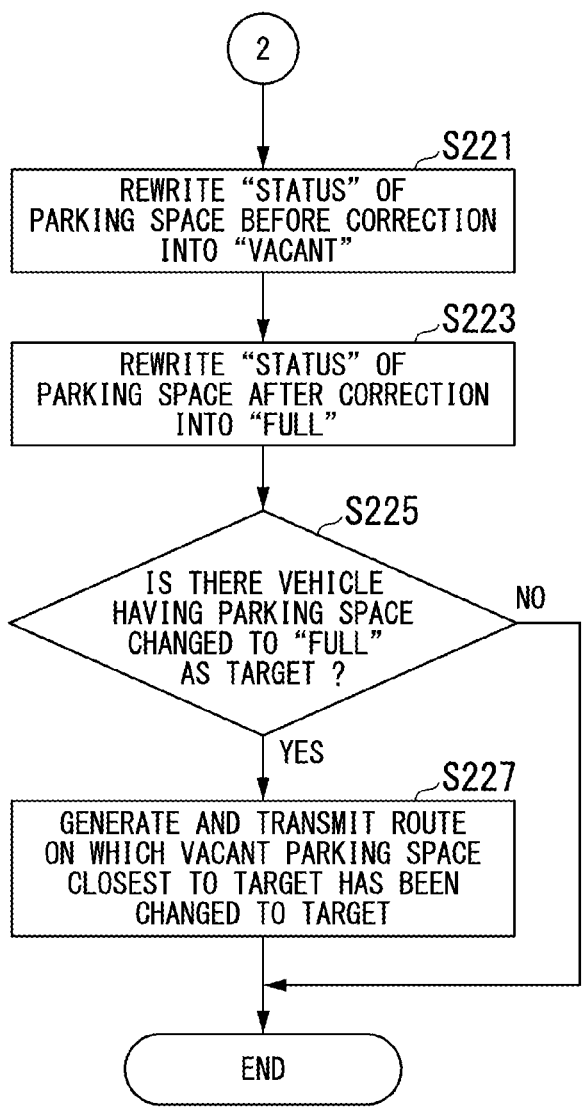
FIG. 17 is a flowchart showing an example of processing procedure of FIG. 16.

FIG. 17 is a flowchart showing an example of the processing procedure of FIG. 16. When the correction information is received, the changer 425 rewrites "status" associated with the parking space identification information (ID: "0025") in the parking space status table 432 as "vacant" on the basis of the parking space identification information (ID: "0025") before correction which is included in the correction information (step S221). Subsequently, the changer 425 rewrites "status" associated with the parking space identification information (ID: "0024") in the parking space status table 432 as "full" on the basis of the parking space identification information (ID: "0024") after correction which is included in the correction information (step S223).

Subsequently, the changer 425 determines whether a vehicle scheduled to be parked in the parking space PS having a parking state changed from "vacant" to "full" in step S223 is present (step S225). When a vehicle scheduled to be parked in the parking space PS having the parking state changed from "vacant" to "full" is present, the changer 425 determines a parking space PS in which no other vehicle is parked as the third target parking vehicle from among parking spaces near the first target parking space having the parking state changed from "vacant" to "full". Then, the changer 425 changes the target of the object vehicle to the third target parking space (step S227).

In this manner, parking positions of vehicles parked in a parking area can be arranged in accordance with parking states managed in the parking space status table 432 without improving the performance of facilities of the parking area.

[Hardware Configuration]

Figure 18:
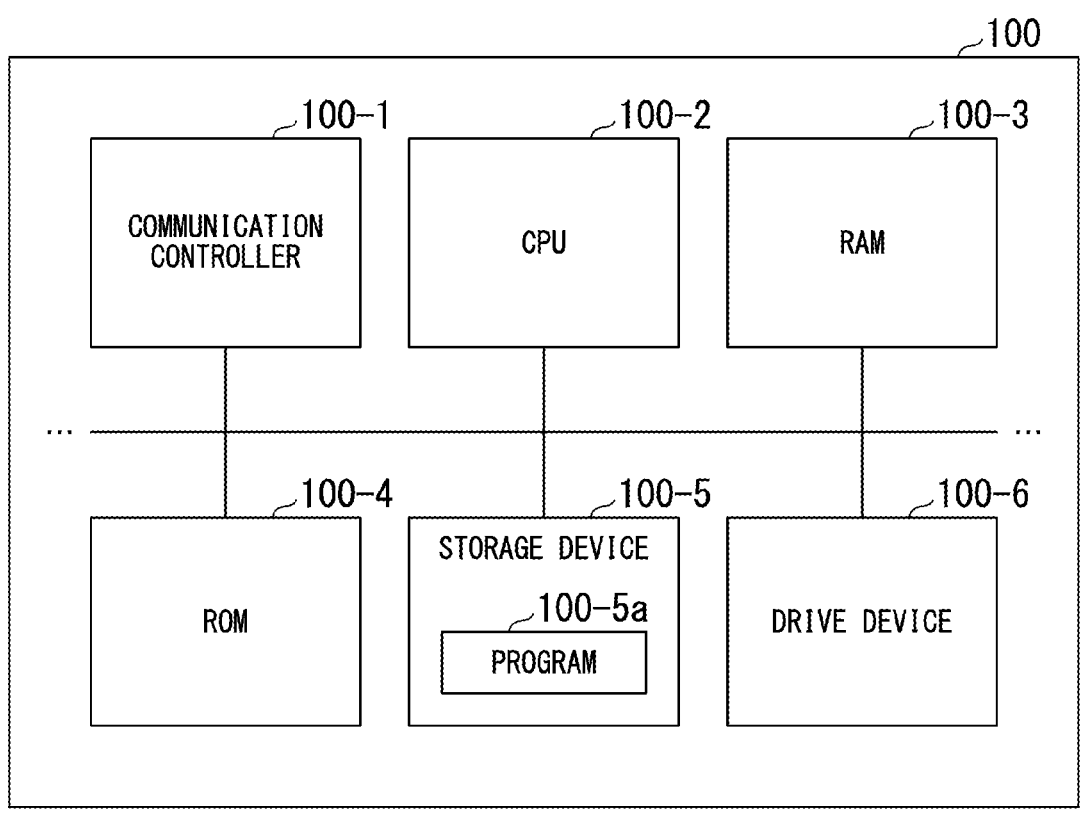
FIG. 18 is a diagram showing an example of a hardware configuration of an automated driving control device of an embodiment.

FIG. 18 is a diagram illustrating an example of a hardware configuration of the automated driving control device 100 according to the embodiment. As illustrated, the automated driving control device 100 has a configuration in which a communication controller 100-1, a CPU 100-2, a random access memory (RAM) 100-3 that is used as a working memory, a read only memory (ROM) 100-4 that stores a boot program or the like, a storage device 100-5 such as a flash memory or a hard disk drive (HDD), a drive device 100-6, and the like are connected to each other through an internal bus or a dedicated communication line. The communication controller 100-1 communicates with components other than the automated driving control device 100. A program 100-5a to be executed by the CPU 100-2 is stored in the storage device 100-5. This program is developed in the RAM 100-3 by a direct memory access (DMA) controller (not shown) or the like and executed by the CPU 100-2. Thereby, one or both of the first controller 120 and the second controller 160 are realized.

The embodiment described above can be represented as follows.

A vehicle management system including a storage device which stores a program and a hardware processor, in which the hardware processor is configured, by executing the program stored in the storage device;

to communicate with a management device, the management device guiding a vehicle capable of automatedly traveling to a target parking space with reference to management information representing parking states of a plurality of parking spaces;

to recognize a surrounding state of the vehicle and generate parking state information including information representing whether other vehicles are parked in parking spaces which the vehicle passes on the basis of the recognized result; and to transmit the parking state information to the management device using a communicator.

While forms for carrying out the present invention have been described using the embodiments, the present invention is not limited to these embodiments at all, and various modifications and substitutions can be made without departing from the gist of the present invention.

For example, an aiming spot may be formed within the parking area PA and each vehicle may perform aiming within a range in which aiming can be performed using vehicle software. At the time of starting parking, each vehicle may pass through the aiming spot and starts parking after aiming is performed. Aiming is, for example, processing of measuring and adjusting the direction of the optical axis of the camera 10, the radar device 12, the finder 14, or the like. A facility for performing aiming may be set at the aiming spot. The parking area management device 400 communicates with communication equipment installed at the aiming spot and acquires information representing the accuracy of outside detection performance of a vehicle passing through the aiming spot.

At the side of a vehicle, a parking space PS in which a parking state managed by the parking area management device 400 differs from an actual parking state may be extracted and only parking state information with respect to the extracted parking space PS may be transmitted to the parking area management device 400. For example, the automated driving control device 100 includes the same functional component as the extractor 424 included in the parking area management device 400. The parking area management device 400 may transmit all information of the parking space status table 432 to the vehicle or transmit only information on full/vacant "status" with respect to a parking space adjacent to a guiding route to the vehicle. For example, the parking area management device 400 transmits, to the vehicle, information representing full/vacant "statuses" arranged in arrangement order of parking spaces of a passage through which the vehicle passes, specifically, information representing that parking states of left parking spaces PS which the vehicle passes are "full, vacant, vacant, full, vacant, . . . ."

The information generator 150 may generate parking state information on the basis of a recognition result recognized by a recognizer of another vehicle parked in a parking space PS. For example, the communication manager 152 transmits a request command for requesting transmission of a recognition result to a parked vehicle recognized by the parking state recognizer 132. The parked vehicle generates parking state information representing that the parked vehicle is parked on the basis of specifying information of the parking space in which it is parked or parking state information with respect to a neighboring parking space PS.

This parked vehicle transmits the generated parking state information to the vehicle or the parking area management device 400 that has transmitted the request command. In the former case, the information generator 150 of the host vehicle M generates parking state information on the basis of the recognition result received from the parked vehicle. In the latter case, the parking area management device 400 updates the parking space status table 432 on the basis of the parking state information received from the host vehicle M and the parking state information received from the parked vehicle. When a parking state recognized by the host vehicle M is not consistent with a parking state recognized by the parked vehicle, the host vehicle M may generate the parking state information on the basis of the parking state recognized by a vehicle having higher outside detection performance and the parking area management device 400 may update the parking space status table 432 on the basis of the parking state recognized by the vehicle having higher outside detection performance

What is claimed is:

1. A vehicle control device comprising:
a communicator which communicates with a management device, the management device guiding a vehicle capable of automatedly traveling to a target parking space with reference to management information representing parking states of a plurality of parking spaces;
a recognizer which recognizes a surrounding state of the vehicle;
a generator which generates parking state information including information representing whether other vehicles are parked in parking spaces which the vehicle passes based on a result recognized by the recognizer and transmits the parking state information to the management device using the communicator; and
a driving controller which performs at least one of speed control and steering control of the vehicle based on the surrounding state recognized by the recognizer and causes the vehicle to be automatically parked in a parking space designated by the management device,
wherein, when the communicator receives information representing a parking space specified by another vehicle recognizer included in another vehicle from the other vehicle in a state in which a vehicle is parked in the parking space, the driving controller determines whether the parking space represented by the information received from the other vehicle is consistent with the parking space designated by the management device and causes the vehicle to move to the parking space designated by the management device when it is determined that the two parking spaces are not consistent with each other.

2. The vehicle control device according to claim 1,
wherein the generator generates the parking state information by associating identification information of parking spaces adjacent to a route along which the vehicle travels with information representing whether other vehicles are parked in the parking spaces adjacent to the route along which the vehicle travels.

3. The vehicle control device according to claim 2,
wherein the generator acquires the identification information of the parking spaces based on a result obtained by recognizing indicating objects provided in the parking spaces by the recognizer.

4. The vehicle control device according to claim 1,
wherein the recognizer specifies a parking space adjacent to the route along which the vehicle travels,
the communicator further communicates with another vehicle, and
the vehicle control device further comprises a communication manager which transmits information representing the parking space specified by the recognizer to another vehicle parked in the parking space specified by the recognizer using the communicator.

5. The vehicle control device according to claim 1,
wherein the communicator communicates with a parked vehicle parked in the parking spaces and receives a recognition result of a parked vehicle recognizer included in the parked vehicle, and
the generator generates the parking state information based on the recognition result received from the parked vehicle.

6. A vehicle control method, using a computer, comprising:
- communicating with a management device, the management device guiding a vehicle capable of automatedly traveling to a target parking space with reference to management information representing parking states of a plurality of parking spaces;
- recognizing a surrounding state of the vehicle;
- generating parking state information including information representing whether other vehicles are parked in parking spaces which the vehicle passes based on the recognized result; and
- transmitting the parking state information to the management device, and
- performing at least one of speed control and steering control of the vehicle based on the surrounding state and causing the vehicle to be automatically parked in a parking space designated by the management device,
- wherein, when the management device receives information representing a parking space specified by another vehicle recognizer included in another vehicle from the other vehicle in a state in which a vehicle is parked in the parking space the management device determines whether the parking space represented by the information received from the other vehicle is consistent with the parking space designated by the management device and causes the vehicle to move to the parking space designated by the management device when it is determined that the two parking spaces are not consistent with each other.

7. A computer readable non-transitory storage medium storing a program causing a computer to:
- communicate with a management device, the management device guiding a vehicle capable of automatedly traveling to a target parking space with reference to management information representing parking states of a plurality of parking spaces;
- recognize a surrounding state of the vehicle;
- generate parking state information including information representing whether other vehicles are parked in parking spaces which the vehicle passes based on the recognized result;
- transmit the parking state information to the management device; and
- perform at least one of speed control and steering control of the vehicle based on the surrounding state and causing the vehicle to be automatically parked in a parking space designated by the management device,
- wherein, when the management device receives information representing a parking space specified by another vehicle recognizer included in another vehicle from the other vehicle in a state in which a vehicle is parked in the parking space the management device determines whether the parking space represented by the information received from the other vehicle is consistent with the parking space designated by the management device and causes the vehicle to move to the parking space designated by the management device when it is determined that the two parking spaces are not consistent with each other.

* * * * *